(12) United States Patent
Whelton

(10) Patent No.: US 11,157,631 B1
(45) Date of Patent: Oct. 26, 2021

(54) SYSTEM AND METHOD FOR SECURELY INDEXING, STORING, AND RETRIEVING DATA WITHIN A COMPUTER NETWORK

(71) Applicant: Robert J. Whelton, Louisville, CO (US)

(72) Inventor: Robert J. Whelton, Louisville, CO (US)

( * ) Notice: Subject to any disclaimer, the term of this patent is extended or adjusted under 35 U.S.C. 154(b) by 491 days.

(21) Appl. No.: 16/224,224

(22) Filed: Dec. 18, 2018

Related U.S. Application Data

(60) Provisional application No. 62/607,323, filed on Dec. 19, 2017.

(51) Int. Cl.
| | |
|---|---|
| G06F 12/14 | (2006.01) |
| G06F 21/60 | (2013.01) |
| G06F 16/22 | (2019.01) |
| G06F 16/953 | (2019.01) |
| H04L 9/06 | (2006.01) |
| G06F 9/54 | (2006.01) |

(52) U.S. Cl.
CPC ............ G06F 21/602 (2013.01); G06F 9/547 (2013.01); G06F 16/2246 (2019.01); G06F 16/953 (2019.01); H04L 9/0643 (2013.01)

(58) Field of Classification Search
CPC ...... G06F 21/602; G06F 21/60; G06F 21/604; G06F 21/62; G06F 21/64; G06F 16/2246; G06F 16/953; G06F 9/547; H04L 9/0643; H04L 9/08; H04L 9/0816; H04L 9/0819; H04L 9/0827; H04L 9/0836; H04L 9/0861; H04L 9/3236; H04L 9/3265; H04W 12/041; H04W 12/0471

USPC .......................................................... 713/194
See application file for complete search history.

(56) References Cited

U.S. PATENT DOCUMENTS

| | | | | |
|---|---|---|---|---|
| 5,978,790 | A * | 11/1999 | Buneman | ............... G06F 16/212 |
| 6,182,111 | B1 * | 1/2001 | Inohara | .................... G06F 16/10 |
| | | | | 709/201 |
| 10,275,480 | B1 * | 4/2019 | Evenson | ............. G06F 16/2255 |
| 10,324,903 | B1 * | 6/2019 | Goldberg | .............. G06F 16/116 |
| 2005/0010585 | A1 * | 1/2005 | Sahinoja | ............. H04L 41/0853 |
| 2008/0052298 | A1 * | 2/2008 | Yeh | ...................... G06F 16/9027 |
| 2008/0133935 | A1 * | 6/2008 | Elovici | .................... H04L 63/08 |
| | | | | 713/193 |
| 2009/0210414 | A1 * | 8/2009 | Shinjo | ................. G06F 16/2246 |
| 2015/0293958 | A1 * | 10/2015 | Chen | .................. G06F 16/2246 |
| | | | | 707/797 |
| 2016/0191509 | A1 * | 6/2016 | Bestler | ............... G06F 12/1408 |
| | | | | 713/163 |

(Continued)

OTHER PUBLICATIONS

Buyrukbilen et al. Privacy-Preserving Ranked Search on Public-Key Encrypted Data, IEEE, Nov. 15, 2013, pp. 165-174.*

(Continued)

Primary Examiner — Luu T Pham
Assistant Examiner — Jenise E Jackson
(74) Attorney, Agent, or Firm — Gardner, Linn, Burkhart & Ondersma LLP

(57) ABSTRACT

According to one embodiment, a system may include a plurality of software components capable of creating a number of computing nodes by employing cryptographic hashing and cipher algorithms. The nodes are configured to implement a number of tree-like index data structures in order to securely store, recall, and exchange digitally encoded information.

18 Claims, 7 Drawing Sheets

(56) References Cited

U.S. PATENT DOCUMENTS

2019/0236071 A1* 8/2019 Pishe .................... G06F 16/248
2019/0394042 A1* 12/2019 Peddada ............. H04W 12/069

OTHER PUBLICATIONS

Moyer et al, Scalable Web Content Attestation, IEEE, Dec. 11, 2009, pp. 686-699.*
Krawczyk, et al., HMAC: Keyed-Hashing for Message Authentication, https://tools.ietf.org/html/rfc2104, Feb. 1997.
Juan Benet, IPFS—Content Addressed, Versioned, P2P File System, https://ipfs.io/ipfs/QmV9tSDx9UiPeWExXEeH6aoDvmihvx6jD5eLb4jbTaKGps, Jul. 2014.

* cited by examiner

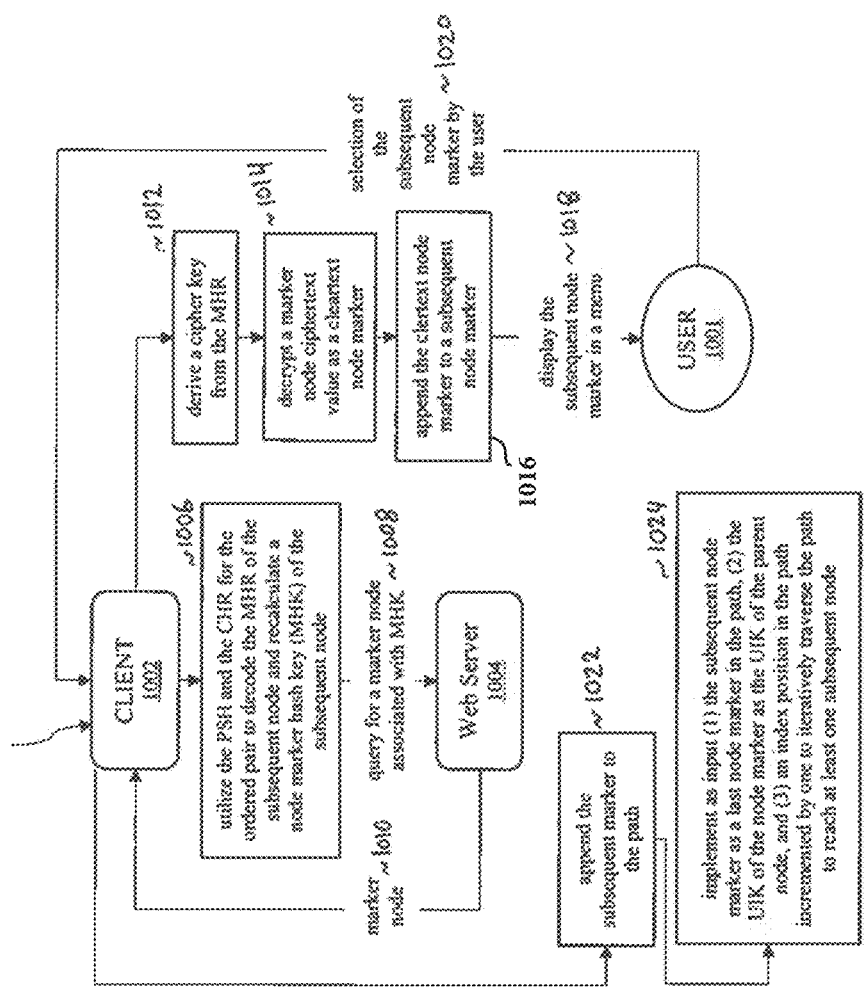
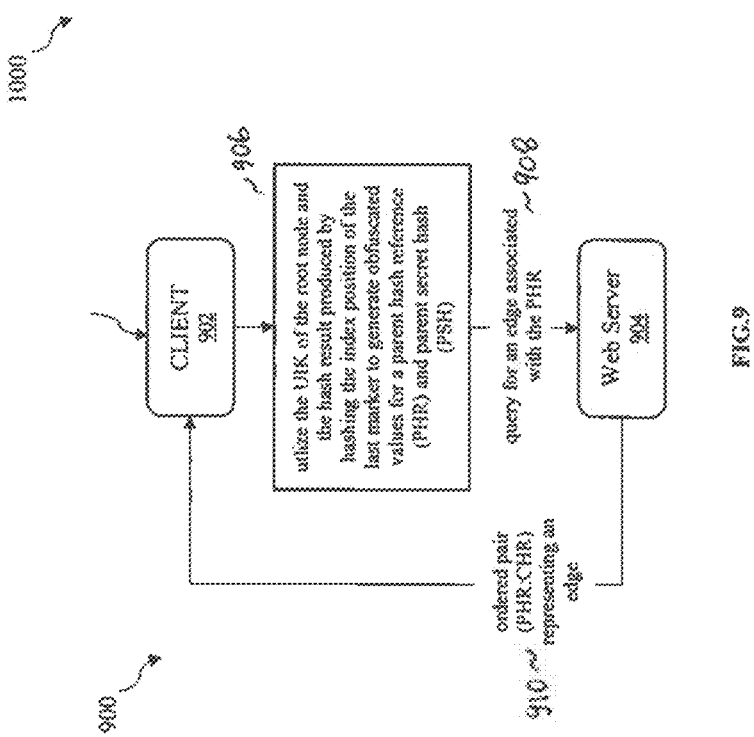
FIG. 10
FIG. 9

SYSTEM AND METHOD FOR SECURELY INDEXING, STORING, AND RETRIEVING DATA WITHIN A COMPUTER NETWORK

PRIORITY DATA

This application claims priority to U.S. Provisional Patent Application Ser. No. 62/607,323, filed Dec. 19, 2017, which is herein incorporated by reference in its entirety.

FIELD OF THE INVENTION

This invention relates to computing systems and, more particularly, to index data structures configured to securely store and recall records of data relationships within open and distributed computing systems.

BACKGROUND OF THE INVENTION

Many different types of computing applications require the relationship(s) among different data items to be maintained in a secured and organized manner in an open and distributed computing system for reference during data processing. For example, a computer file system may be configured to store, maintain, and recall information by identifying the relationships between individual files and the specific storage location(s) within virtual or physical storage systems at which corresponding file data is stored. To access the data of a particular file according to its identifier, the system may consult data structures that map the identifier(s) to various storage locations, and then access the identified storage location(s) to retrieve the file data.

An open system is one that is openly accessible to the public, interacts with its external environment, and facilitates the exchange of information between the system and its external environment. The best example of such an open system is the Internet. The openness of the Internet presents serious challenges to those who wish to securely and efficiently store, recall, and exchange information stored within remote/virtual storage system(s).

The ultimate burden for the security of information within an open system is placed on an individual user by requiring the user to safeguard secrets, keys, and/or passwords used to protect that information. The more powerful the security measure, the more complicated the secrets, keys, and/or password become. The complexity of the security measures implemented today on the Internet requires significant hardware and operational investments. The bulk of this overhead is imposed on information service providers in the form of server software, computers, and specialized computing devices needed to handle the security measures. Asymmetric cryptography that uses public and private keys to encrypt and decrypt data is one of the known and powerful but complex techniques to securely store, recall, and exchange confidential information. In the asymmetric cryptography security depends on the secrecy of the private key. Despite the effectiveness of modern cryptographic techniques, however, they remain vulnerable to various weaknesses. For example, in a computer security context, client-side vulnerabilities or attacks refer to those that occur on the client/user's computer system, rather than on the server side, or in between the two. As an example, if a server contained an encrypted file or message which could only be decrypted using a key housed on the user's computer system, a client-side attack would normally be an attacker's only opportunity to gain access to the decrypted contents. For instance, the attacker might cause malware to be installed on the client system which allowed the attacker to view the user's screen, record the user's keystrokes, steal copies of the user's encryption keys, etc. Alternatively, an attacker might employ cross-site scripting vulnerabilities in order to execute malicious code on the client's system without needing to install any permanently resident malware. Thus, there are a few particular vulnerabilities that the present invention aims to mitigate: (1) the secure creation and safekeeping of secret keys for a user because users, in order to easily remember their keys and passwords, are notoriously lax in choosing easily guessed secrets and passwords, and (2) man-in-the middle attacks and SSL inspection or TLS interception techniques which allow an unauthorized party to decrypt, examine, and re-encrypt messages midstream.

Thus, current systems that use cryptography to securely manage information may suffer from the following issues: first, key management, exchange, and protection are a significant challenge at the risk of exposure and cryptanalysis of critical key materials; second, many such systems are designed either to protect data in transit, or at rest within internal database systems, but seldom both comprehensively, requiring complex, costly solutions made up of many layers of various technologies and components. The illustrative embodiments improve these systems by recognizing and adapting to those instances.

By recognizing and adapting to key management, exchange, and protection challenges as well as fully protecting data in transit and at rest, the illustrative embodiments can improve information security, resulting in lower cost secure information management systems that can safely be implemented as open and decentralized systems on the Internet. The novel, uncommon and atypical examples and concepts described herein demonstrate potential improvements achievable through use of those examples, concepts, and the like.

Therefore, the present invention provides a system and methods for simpler and more secure technique for storing, recalling, and exchanging of information within an open system, for example private keys or digital signatures, by using a data index. A user of the index only needs to know a secret when first creating, for example, private keys, which are kept secret and never shared, but can always be regenerated from the known secret. Since the user is not required to repeatedly re-enter the known secret, they can choose one that is sufficiently long and complex to mitigate cracking attempts. The rest of the storage and recollection methods are implemented in software without requiring user interaction or understanding. The majority of the methods for the present invention are implemented on client computing resources, ascribing the processing costs to the end user devices. Thereby, confidentiality and integrity of private keys or digital signatures and subsequent confidential information which the keys unlock or digital signatures append to during confidential information exchange are enforced by the client with no need for key exchange, where the keys or digital signatures can be stored locally with cryptographic techniques and security methods that mitigate a risk of exposure.

SUMMARY OF THE INVENTION

Various embodiments of a system and methods for securely indexing data in a tree index data structure are disclosed.

According to one form of the present invention, a system for securely indexing data in a tree index data structure may include a user computing device including a processor and a computer-readable storage medium. The computer-readable storage medium includes browser-implemented program instructions. The system may further include a client to access a server via a network and to execute the browser-implemented program instructions stored on the computer-readable storage medium. The system may further include a security module to interface with the client, to provide secure storage of cryptographic credentials of the user and to execute cryptographic functions by employing the secret keys. The cryptographic credentials include identity, secret keys, and public-private key-pair and the cryptographic functions include hash and cipher functionalities of the security module. The system may further include a web server to provide an application programming interface (API) for storing data in a key-value-pair database and recalling the data from the database. The system may further include a directory server to direct the client to the web server and provide cryptographic parameters for hashing and ciphering. The cryptographic parameters are used by the browser-based application and executed by the client to initialize the client to determine the web server, the cryptographic parameters, and the cryptographic credentials in order to securely store the data in a tree index by executing a sequence of iterative steps, or securely recall the data stored in the tree index by executing a sequence of iterative steps.

According to another form of the present invention, a method for securely indexing data in a tree index data structure include initializing a client to determine a web server, cryptographic parameters, and cryptographic credentials, obtaining, by the client, from a user a node marker in a path to create a node of the tree index data structure, determining, by the client, values of additional input parameters for iteration of the node marker, establishing, by the client, a user input value. The user input value is received by the client from the user or set by the client in response to the user not providing the user input value. The method may further include securely storing, by the client, the data in a tree index by executing a sequence of iterative steps.

According to yet another form of the present invention, a method to securely recall data stored in a tree index data structure include obtaining, by a client, from a user a node marker in a path to recall a node of the tree index data structure, determining, by the client, values of additional input parameters for iteration of the node marker, establishing, by the client, input parameters including a last node marker in the path, a unique index key of a parent node, and a hash result produced by hashing the index position of a last node marker in the path, calculating, by the client, the unique index key and a node marker hash result of the node to be recalled by implementing the input parameters as input, implementing, by the client, the unique index key of the node to query a web server for the node, receiving, by the client, from the web server the node, deriving, by the client, a cipher key unique to the node, decrypting, by the client via a security module, a ciphertext value of the node, and displaying, by the client, the cleartext value to the user.

Thus, the present invention provides a system and a method for secure indexing of data within a computer system, and allows to easily and securely store, recall, and exchange confidential information.

These and other objects, advantages, purposes and features of the present invention will become apparent upon review of the following specification in conjunction with the drawings.

BRIEF DESCRIPTION OF THE DRAWINGS

FIG. 9 is a flow diagram illustrating one embodiment of a method to recall an edge connecting the parent node to the child node and stored within the system illustrated in FIG. 3.

FIG. 10 is a flow diagram illustrating one embodiment of a method to recall the child node with data stored within the system illustrated in FIG. 3.

Figure 1:
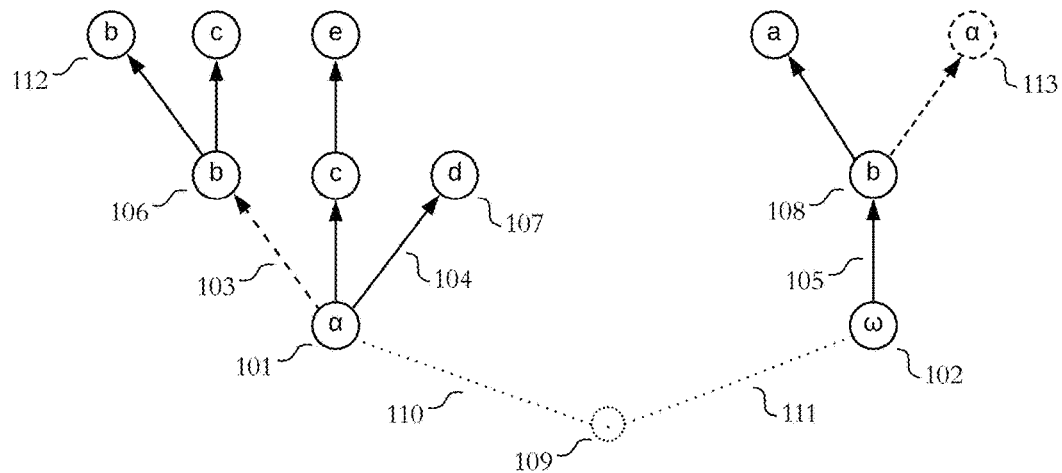
FIG. 1 illustrates one embodiment of an index tree data structure, in accordance with the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

In the following description, numerous specific details are set forth to provide a thorough understanding of the present invention. However, one having ordinary skill in the art should recognize that the invention might be practiced without these specific details. In some instances, well known circuits, structures, signals, computer program instruction, and techniques have not been shown in detail to avoid obscuring the present invention.

Introduction

The present invention describes an indexing system and methods that facilitate secure identification and location of information resources. This description begins with the fundamental structure and functionality of the index as a tree, followed by the specific properties and functionality of this data structure when combined with rudimentary hashing techniques. The methods for storing, recalling, deleting, and updating information are described based on the basic hashing functionality to focus on the operations without the added complexity of cryptographic techniques. Next, the confidentiality and other security features of the index are described by applying cryptographic techniques to the methods defined, as well as how the overall approach pertains to both public and private trees in the index. With the primary functionality thus established, the methods for exchanging information via the index are then explained. The description concludes by proposing various modes of implementation to constitute a functional system based on these methods.

Data Architecture

This invention specifies a tree data structure that is fundamental to the operation of the system and the functionality of the indexing methods. A tree is a standard subject of data structures and graph theory in computer science that is being applied here in a manner that is unique to the system and methods of this invention. A forest, in turn, is defined as being a set of two or more separate and distinct trees. The functionality and terminology of this data architecture is the necessary basis for understanding the description of this invention. The following paragraphs will describe the tree data structure as it applies to this invention, while defining the relevant terminology as it will be used in the subsequent descriptions of this invention.

The purpose of this invention is to index information in a manner that facilitates the storage, recall, and exchange of the information in an open system that resides on the Internet or similar communication network. An index is a data structure used to map some given input to a value that is to be stored or recalled within the system of this invention. The index described by this invention is a graph in the form of a tree or a forest of trees, and therefore is called a tree index or forest index, respectively.

A graph is a data structure comprised of interconnected nodes that can be represented visually (graphically) in some form of diagram, figure, or illustration. Such a data structure provides both a means of maintaining the organization of the information, as well as facilitating methods for visualizing the data for human understanding and navigation. The visualization methods are not defined by this invention. Rather, the design of the invention is generalized through this graph structure to support various visualization methods to be identified and applied in the implementation of the invention.

The graph in this invention is a directed acyclic graph (DAG), which means the relationship between points is directional, starting from a source point and moving towards destination points; and does not allow cycles to be formed by moving from a destination point to a preceding point that was a source from which it derived.

A node is a data object represented by a point (a single coordinate specified by one or more dimensional values) in a diagram. In the context of this invention, the node has a key and a value, the purpose of which is to logically embody an item of information being stored or recalled by the system of this invention. The form of graph employed in this invention consists of semantically related nodes, meaning their relative positions are contextual and not spacial, though the graph may be visualized using points in a one, two, or three dimensional Cartesian space.

A key is a large, unintelligible integer value that can be used to locate or decipher a corresponding information value. In other words, a key can be a distinct value in an index (specifically an index key), or a secret value used for obfuscation, encryption, and decryption (specifically a secret key or cipher key). It is the first meaning, index key, which applies to the general term 'key' as it appears in this description of the data architecture of the index.

The node value comprises the information stored at or recalled from the node, which may be any type of structured data object that is interpreted by the application of the implementation. The value is interpreted as cleartext data, meaning that it is not encrypted or obfuscated and can be readily understood. However, the objective of this invention is to store the value as undecipherable data, which has been obfuscated and encrypted, known as ciphertext.

Nodes are connected by edges, each of which are visually represented by a line (a straight one-dimensional figure extending between two points and having visible thickness only for the sake of presentation.) An edge is specified by the nodes at either end as an ordered pair that indicates the direction, where the first element of the pair is the source, and the second is the destination. In regard to the relationship defined by an edge connecting two nodes, the source (first element of the pair) is the parent node, and the destination (second element) is the child node. Furthermore, an ancestor is any node that precedes a connected node in the graph, in other words a node reachable by repeatedly preceding from child to parent in the reverse direction of the DAG; and a descendant is any node that follows a connected node in the graph, reached by preceding repeatedly in the direction of the DAG.

Three additional data structures that are used to describe the data architecture and methods of this invention include:

A list, which is a plurality of elements that are not sorted, but are ordered according to the sequence in which the elements were added to the list. A list is represented by a series of comma separated values within parenthesis. For example: (c, b, a, 2, 3, 1), which has the same values but a different order than (a, b, c, 1, 2, 3) and so is not an identical list. In an ordered list, each element in the list has a numerically indexable position, which is specified by its offset from the start of the list. The first element of the list has an index of 0, because it is offset by zero elements that precede it in the list. The second element has an index of 1, because there is one element that precedes it in the list. The third element has an index of 2, the fourth index is 3, and so on up to the $N^{th}$ element in the list with an index of N−1.

A set, which is an unordered plurality of elements, i.e. a collection of elements that does not maintain any ordering of its elements, which can be rearranged without altering the evaluation of the set. A set is represented by a series of comma separate values within curly braces. For example: {1, 2, 3, c, b, a}, which is identical to {a, b, c, 1, 2, 3}, because the order does not matter.

A map, which is an indexed set of key-value pairs, maps a key to a value in the set. The set is unordered and unsorted, but the keys can be sorted to access the values in sorted order. A map is represented by colon separated key-value pairs, in the form 'key:value', separated by commas and within curly braces. For example: {c:3, a:1, b:2}, the sorted keys of which are the ordered list (a, b, c), and the values are the set {1, 2, 3}, which can be in any order. Note that a node is a key-value pair, and thus the index of this invention is also a map, though a map corresponds to a simpler data structure definition that is not equivalent to the index of this invention.

The fundamental structure of the forest index of this invention is that of a tree graph. A tree is a specialized form of DAG that has a single starting node known as the root node, which leads to branches, which may lead to more branches, and so on, eventually terminating in leaves. In a tree, each path from the root to a leaf is unique. In other words, there is only one possible path from the root to a leaf and thus two or more branches cannot be rejoined at a common point on the way from the root to a leaf. This is also called an "oriented tree" or "rooted tree" according to Knuth [D. Knuth, The Art of Computer Programming: Fundamental Algorithms, 3rd Ed. Reading, Mass.: Addison-Wesley, 1997. pp. 372-376.]

A branch node is one that is associated with one or more directional edges, called limbs. A branch node may be referred to as simply 'branch'. A leaf node, or just 'leaf', has no limbs, and is therefore a terminal end point in the tree. A limb connects a parent node, called a branch node, to a child node that may be a branch or leaf node.

A marker is intelligible information that marks the location of a node to be stored in or recalled from the index of this invention, e.g. a marker leads the way to a node, like the trail markers that show the way on a forest path. A marker may be a textual label or an image/icon/emblem/logo. The purpose of a marker, as an element of a path, is to present a node's relative location in the index. Thus, it can be referred to as a "node marker", and though a marker is not exclusively associated with a single node in a one-to-one relationship, the terms "node marker" and "marker" are used synonymously in this description. Many nodes can have the same marker.

A path is a list of markers that leads from the root of a tree (a root node), as the starting point, to an end point, being the location of a node. Each marker in a path is relative to the series of markers that precede it in the path. A node located by a path can be a branch along the way to other nodes, or a leaf containing some final information being sought. A root node is a branch that has no parent, thus its path contains a single marker, and so the root node marker must be a unique value such that no two root nodes can have the same marker. Whereas, a non-root node's marker is relative to its parent node's path and must only be unique within the context of the parent path.

The index key that specifically identifies a particular node within the index of this invention is calculated from a path using a deterministic algorithm implemented within functions described in the method of this invention. A deterministic algorithm is one that, given the same input, is guaranteed to produce the same result. As such, an index key is deterministically related to a path that represents the node when presented to a human user. A path establishes a context that is meaningful to a human user of this invention, such that the user is able to contextually recognize what information is stored in the identified node. Thus, there is a human readable path identifier for a node, and an index key identifier of a node that is deterministically derived from the path. The index key identifier is simply called a unique index key (UIK). The path of a root node is a root node identifier, which is congruent with a root node marker, in that they evaluate to the same marker value. The path of a non-root node is likewise a node identifier, but this is not congruent with the node's marker, because there are preceding markers in the path such that the path is not the same as the node marker value. A node identifier (path) is exclusively associated with a single node in a one-to-one relationship.

As previously stated, the index of this invention facilitates a tree index with a root or an index composed of multiple trees with distinct roots, known as a forest index. A forest is technically the same as a tree, which is a recursive construct. A tree is a collection of branches and leaves connected to a common parent node, identified as the root. A branch or leaf node in a tree becomes the root of a separate tree if it is disconnected from its parent. Thus, even an individual, isolated node is technically a tree that consists of a root node with no descendant branches or leaves. Conversely, multiple trees in a forest, or even the entire forest, can become a single tree by connecting all root nodes to a common parent node.

Furthermore, the value of a node can contain any form of structured data, including that of a forest, like the index of this invention. In other words, each leaf of the forest can contain a forest of the same structure as itself, and so the index is a fractal-like construct.

One embodiment of a forest index consisting of two tree index data structures is shown in FIG. 1, which presents a simple example that illustrates this data architecture. The diagram depicts a forest with two trees, one with a root identified as 'α' (101), and the other with a root node marker of 'ω' (102). Both node 101 and 102 are branch nodes, having limbs 103, 104, and 105 extending in the direction indicated by the arrows to nodes 106, 107, and 108, which are each branch nodes as well. A third tree could be established in this forest with root 'b' (106) by deleting limb 103. Alternatively, if another node were added at point 109 with limbs connecting to both roots 'α' (limb 110 connecting 109 to 101) and 'ω' (limb 111 connecting 109 to 102), then the forest would be combined into a single tree.

The markers for nodes 106 and 107 ('b' and 'd'), must be distinct with respect to their parent node 'α' (101). The path that uniquely identifies node 106 is ('α', 'b'), and the path identifying node 107 is ('α', 'd'). However, either marker may reappear with a different parent, such as at node 108 with marker 'b', which is unique when combined with its parent 'ω', having a path of ('ω', 'b'); even where it's relative to a parent with the same marker, as in path ('α', 'b', 'b') at node 112. Although, by definition this data architecture would allow for the markers of root nodes to be used for descendent nodes, such as at path ('ω', 'b', 'α') at node 113, this is inadvisable, since root node markers act as unique entry points into the forest (the implications of which become clearer as the methods of this invention are described.)

The data structure of the forest depicted in FIG. 1 can be represented as text-encoded data using lists and maps as follows, where nodes are distinguished by their paths as the key, and limbs are implied within each path. The values stored at each node are omitted in the FIG. 1 for clarity, and represented by ellipses in the encoded data example.

Encoded Data Example 1:
    forest: {
      nodes: {
        ('α'): . . . ,
        ('α', 'b'): . . . ,
        ('α', 'b', 'b'): . . . ,
        ('α', 'b', 'c'): . . . ,
        ('α', 'c'): . . . ,
        ('α', 'c', 'e'): . . . ,
        ('α', 'd'): . . . ,
        ('ω'): . . . ,
        ('ω', 'b'): . . . ,
        ('ω', 'b', 'a'): . . . ,
        ('ω', 'b', 'α'): . . .
      }
    }

A tree is the same as a forest, except that it is constrained to only one root node. The tree with root 'ω', may be encoded like so:

Encoded Data Example 2:
    tree: {
      nodes: {
        ('ω'): . . . ,
        ('ω', 'b'): . . . ,

```
      ('ω', 'b', 'a'): ...,
      ('ω', 'b', 'a'): ...
    }
  }
```

Figure 2:
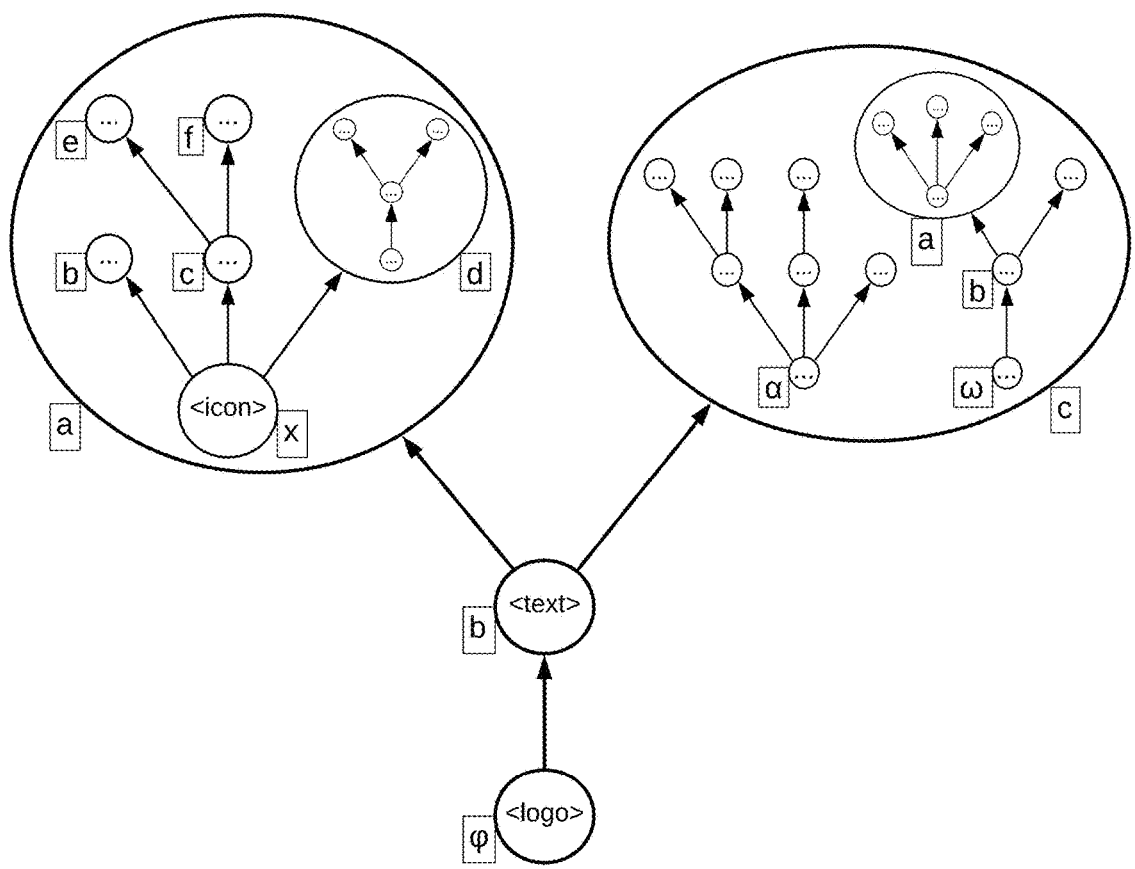
FIG. 2 illustrates one embodiment of a fractal tree index data structure that uses the index tree data structure illustrated in FIG. 1.

Another embodiment shown in FIG. 2 presents a tree index data structure that is different than the forest shown in FIG. 1 for the purpose of demonstrating the fractal-like structural capabilities of this data architecture. Additionally, FIG. 2 displays values of the nodes instead of the keys, with relevant keys shown as tags next to the nodes. Note that the entire forest from FIG. 1 is represented in the value for the node at path ('φ', 'b', 'c'). Furthermore, the node at path ('ω', 'b', 'α') within that forest value depicts a value containing another tree. Thus, it is possible to envision how this data architecture facilitates a fractal-like structure with one or more trees being within one or more leaves of one or more trees of a forest, while the forest could similarly be within one or more leaves of one or more trees of another forest, and so on. The following data encoding is an abbreviated example that shows how this structure may be encoded.

Encoded Data Example 3:

```
    tree: {
      nodes: {
        ('φ'): <logo>
        ('φ', 'b'): <text>,
        ('φ', 'b', 'a'): tree: {
          nodes: {
            ('x'): ...,
            ('x', 'b'): ...,
            ('x', 'c'): ...,
            ('x', 'c', 'e'): ...,
            ('x', 'c', 'f'): ...,
            ('x', 'd'): tree: {...}
          }
        },
        'φ', 'b', 'c' ): forest: {
          nodes: {
            ('α'): ...,
            ...,
            ('ω'): ...,
            ...,
          }
        }
      }
    }
```

The limbs (edges) of a forest graph can also be represented in an encoded data structure consisting of a set of ordered-pairs that each specify a limb. Each ordered pair specifies the parent node using its path the same as for the node key above, and the marker of the child node. Notice that the child marker can be appended to the parent path to derive the child's path. Again, the same encoding structure of the forest used in the example below can be used for a single tree as previously demonstrated. (Note that in practice, the paths and markers are converted to keys for these encodings, which will be described in more detail in the methods of this invention.) The following example shows this limb encoding for the forest in FIG. 1.

Encoded Data Example 4:

```
  forest: {
    nodes: { ... },
    limbs: {
      (('α'), 'b'),
      (('α', 'b'), 'b'),
      (('α', 'b'), 'c'),
      (('α'), 'c'),
      (('α', 'c'), 'e'),
      (('α'), 'd'),
      (('ω'), 'b'),
      (('ω'), 'd'),
      (('ω', 'b'), 'a'),
      (('ω', 'b'), 'a')
    }
  }
```

System Architecture

Figure 3:
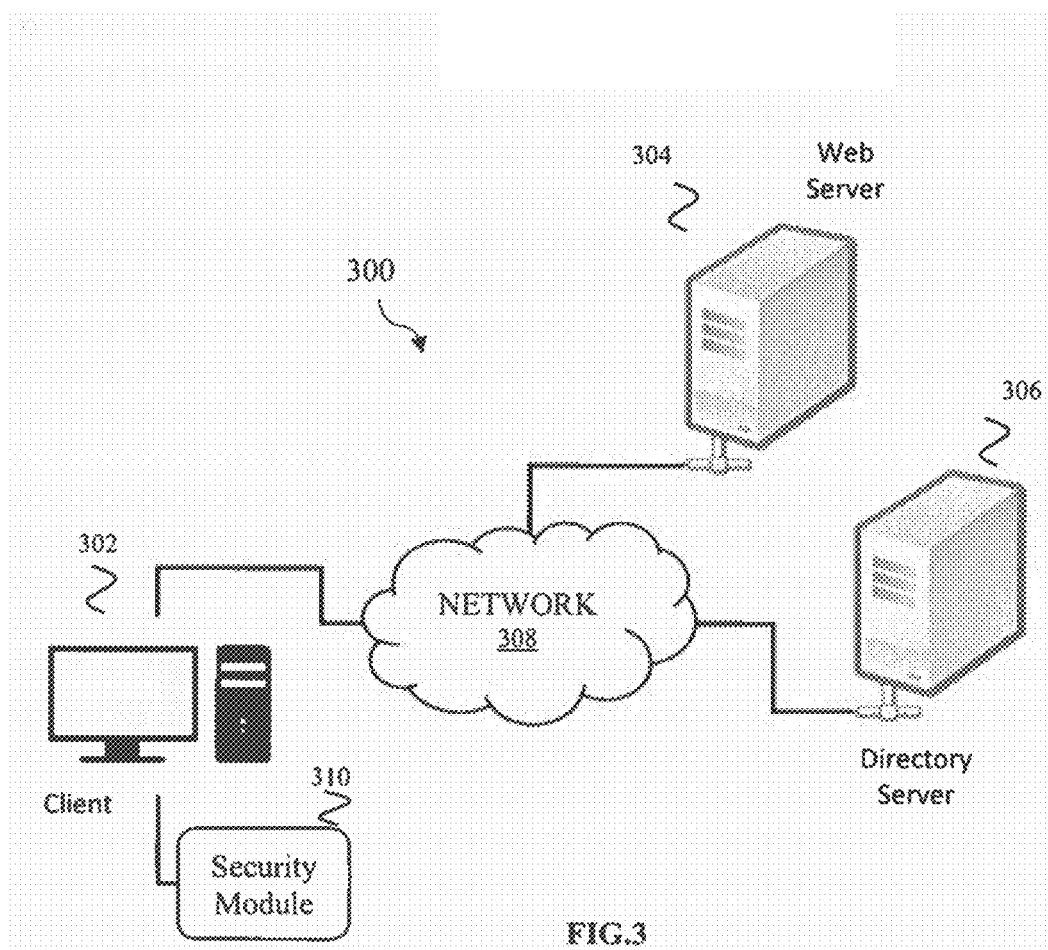
FIG. 3 illustrates an embodiment of an indexing system, according to various embodiments. The system is implemented in a machine-accessible and readable medium and is accessible over a network.

Referring now to FIG. 3, a generalized block diagram of one embodiment of the system 300 is shown. System 300 consists of four main components. The first component is a client 302, which is a computer application, such as a web browser, which runs on a user's local computer, smartphone, or other device, and accesses a service made available by a server. The server is often (but not always) on another computer system, in which case the client accesses the service by way of a network. The client runs a browser-based application that specifically implements the steps of this invention. The host web browser software may be a general purpose web browser or a specialized desktop/mobile application for the purpose of this invention. This component is the only client component in the system of this invention and will be referred to simply as the client throughout the rest of this specification.

The second component is a web server 304, which is a software or hardware dedicated to implementing the software that runs on a cloud computing device for an express purpose of storing and recalling data for the client. The web server 304 provides an application programming interface (API) for storing and recalling information, as well as retaining the information being managed by this invention in a key-value-pair database that is specific to the implementation of the web server 304. The database may be a local database running on the server or a remote database system running 'behind' the web server on separate computing devices.

A third component is a directory server 306, which is a software or hardware dedicated to implementing the software that runs on a network-based computing device for the purpose of directing the client 302 to the web server 304 as well as providing appropriate cryptographic parameters to use by the methods of this invention. The web server 304 and cryptographic parameters are determined from a root node marker provided by the client 302. The directory server 306 may be implemented and maintained by a third party. An example of a directory server is an authoritative Domain Name Server, which provides the server address in a standard address (A) record. The cryptographic algorithm parameters may be supplied by DNS in a text (TXT) record or there may be a discovery service running on the web server at the given address that will answer an initial query for these parameters.

A fourth component is a client security module (CSM) 310 which provides secure storage of the user's cryptographic credentials consisting of their identity, secret keys, and public/private key-pair. It is also responsible for executing cryptographic functions, including hash and cipher functions, employing the secret keys in a manner that protects the secret keys from exposure. The CSM 310 protects the confidentiality and integrity of the credentials by keeping the secret keys and private keys securely within the CSM 310 without giving the client 302 access directly to the keys but instead providing access to these keys by way of executing the cryptographic functions requiring these keys on behalf of the client 302. The CSM 310 component runs on the client 302 and interfaces with the client 302. This may be implemented as a custom component of the system that is a software module running within the client application. In some embodiments, however, the CSM 310 may be implemented by employing a separate, commercial, off-the-shelf (COTS) or modifiable off-the-shelf (MOTS) security module component, implemented and supported by a third party, which securely maintains credentials and performs cryptographic functions. Examples of COTS/MOTS security modules that might be used as the CSM include Keychain or Keystore software provided by the host operating system, a hardware wallet, a security processor, or a USB connected HSM.

The CSM 310 provides the following functionalities to the client 302: (a) query credentials which allows the client to get the user identity, identifiers of the secret keys, and public key associated with the user based on a root node marker given by the client. If credentials do not exist, this functionality returns a value that indicates that case, so that the client 302 knows that new credentials must be created for the given user and a root node marker as established by the user; (b) create credentials which allows the client 302 to create a new set of credentials consisting of the user identity, secret keys, and public/private key-pair. These credentials are based on and associated with a user name and a root node marker provided by the client 302. The secret keys and private key are kept securely within the CSM 310 and can be referenced by the client 302 using the secret key identifiers and public key retrieved with the "query credentials" functionality above; (c) hash with secret keys which executes a well-known hash function, as specified by the client 302, that digests a concatenated series of client inputs, returning a large integer value as the hash result. The client 302 also specifies one or more secret key identifiers that the CSM 310 uses to access the specified secret keys and includes them in the digested input to get a hash result that is unique with respect to the specified secret keys; (d) The CSM 310 may also provide the hash functionality with no secret keys added to the digested input; (e) sign with private key which executes a well-known asymmetric digital signing function, as specified by the client 302, that digests a concatenated series of client inputs and produces a digital signature for that input using the private key associated with a given public key as previously retrieved by the client using the "query public key" functionality; (f) encrypt with public key which executes a well-known asymmetric encryption function, as specified by the client 302, that encrypts a concatenated series of client inputs with the public key given by the client. This function returns the encrypted ciphertext that corresponds to the given input; and (g) decrypt with private key which executes a well-known asymmetric decryption function, as specified by the client, that decrypts a ciphertext input provided by the client 302 with the private key associated with the public key given by the client 302. This functionality returns a cleartext string that can be restored to the original series of concatenated inputs by the client 302; (h) encrypt with symmetric cipher key which executes a well-known symmetric encryption function, as specified by the client 302, that encrypts a concatenated series of client inputs with the cipher key given by the client 302; (i) decrypt with symmetric cipher key which executes a well-known symmetric decryption function, as specified by the client 302, that decrypts a ciphertext input provided by the client 302 with the cipher key given by the client 302. This functionality returns a cleartext string that can be restored to the original series of concatenated inputs by the client 302.

For the sake of consistency, the CSM 310 should be able to implement any other well-known cryptographic functions, including hash functions, symmetric encryption and decryption functions. However, these functions that do not rely on secret keys or private keys can be provided directly to the client by another standard library.

The client 302 is the central component of the system of this invention, interacting directly with the other three components. The method of this invention involves several complex functions, described in detail below, that are implemented by the client 302 in order to coordinate these interactions. Each interaction between the client 302 and one of the other three components is described separately with reference to various functions involved, which are described in detail later in this specification.

System Component Interactions

Initialization

The client must initially determine a servicing web server, cryptographic parameters (algorithm specifications) for executing the steps of this invention, and cryptographic credentials used in the system's component interactions.

Figure 4:
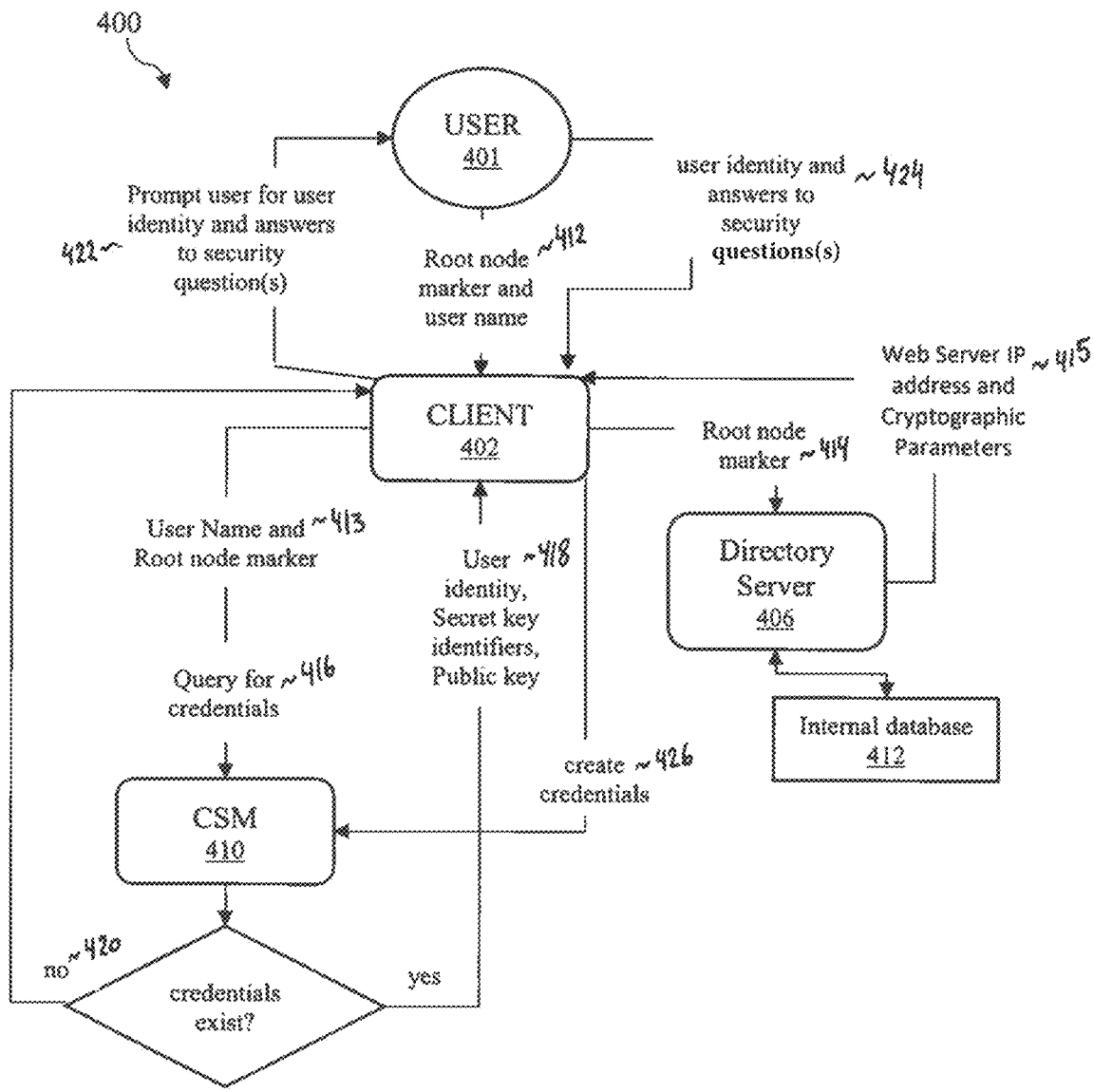
FIG. 4 is a flow diagram illustrating one embodiment of a method to initialize the client of the system illustrated in FIG. 3.

Turning now to FIG. 4, a block diagram of one embodiment of a method for providing client initialization is shown. The first step 412 is for the user 401 to input and for the client 402 to receive a root node marker of a tree index in which the user 401 intends to first store and later recall information. In a typical example, the root node marker is the domain name of the web server where the information is to be maintained, such as forest.example.com.

In the second step 414 the client 402 queries the directory server 406 with the given root node marker. The directory server 406 searches its internal database 412 to locate data values associated with the given root node marker. These values consist of the web server Internet address, and cryptographic parameters (or algorithm specifications) for hashing and ciphering which are provided in step 415 to the client 402. The algorithm specifications declare a common name by which each algorithm is known, and a number of bits (also known as size) used in this instance of the algorithm implementation. The algorithm code is not included, but is implemented in code incorporated within the client 402 and can be located with the common name of the algorithm.

The third step requires to fully initialize the client 402 for interaction within the system by establishing the user's credentials. The user's credentials include user's identity, secret keys, and public/private key-pair. For that purpose, the client 402 queries the CSM 410 for these credentials in step 416 by prompting the user 410 to provide a user name and the root node marker previously created by the user 410. The client 402 provides the user name and the root node marker in step 413 to the CSM 410. The CSM 410 locates the combination of the given user name and root node marker in its internal database, and, if found, returns to the client 402 in step 418 the applicable user identity, secret key identifiers, and a public key (to preserve secrecy of the secret keys and the private key, the client receives only secret key identifiers, and a public key). There are two secret keys used by the system, referred to as secret-key-0 and secret-key-1 (also known as, $S_0$ and $S_1$ in mathematic formulas, or secret_0 and secret_1 in pseudo code). Thus, there are two secret key identifiers identifying each of the two secret keys [secret key identifier 0 and 1]. If the user credentials for the given user and root node marker combination is not found, then the CSM replies in step 420 that the credentials do not exist. The secret key identifiers provide the means for the client 402 to specify the secret key and thereby indicates the appropriate usage of the secret key within the system.

The forth step is required if the CSM 410 responded that the credentials do not exist in step 420. In that case, the client 402 prompts the user 401 in step 422 for inputs to be provided to the client 402 so that the CSM 410 is to create the credentials. The required inputs in step 424 include a user identity, which is a public name by which the user 401 wishes to be known within the context of the root node marker, and answers to two or more secret questions that are concatenated to form a set of secret material from which the secret keys and public/private key-pair can be generated by the CSM 410. The client 402 calls the "create credentials" functionality of the CSM 410 in step 426 providing the user name, root node marker, user identity, and the secret material as input parameters. The CSM 410 produces the secret keys by executing function 1, generate_keys( ), as described on page 33 of this specification. The public/private key-pair are generated using standard, well-known functionality, as defined for the selected asymmetric cipher algorithm, which may use some combination of the provided inputs as source material, or it may use a cryptographically secure pseudo random number generator as the source. The CSM 410 then constructs the credentials record from the user identity, secret keys, and public/private key pair, in combination with the user name plus root node marker as the primary key of the record, which is then stored within its internal database. The CSM 410 replies with a success message, or a failure message indicating the cause of the failure. In an alternative embodiment, the CSM 410 may execute one or more alternative functions that achieve the same result as function 1, generate_keys( ), if the CSM 410 is a third party component of the system. In the preferred embodiment, however, the CSM 410 produces and stores the keys internally in this manner to protect them properly.

Main Interaction

Having established the web server address, cryptographic parameters (algorithm specifications), and user credentials consisting of the user identity and secret keys, the client may subsequently perform functions required to produce index keys, values, nodes, and limbs that are used to store and recall the user's information in a forest index. To understand this invention, the procedures for storing, recalling, and exchanging information are presented separately, beginning with storing, as this will establish the structure of the information needed to comprehend how it is then recalled and exchanged.

Storage Procedure

The primary objective of this invention is to allow the user to create a tree structure for organizing their information in a manner that is efficient and secure for storing and recalling the information according to the user's personal preferences. This is similar to how a user would use directories in the file system of their personal computer. It is up to the user to create the structure of their tree, and they can make it as wide and tall as they like. This is an ongoing process, where the user is able to continue periodically updating their tree with new paths indefinitely. For example, assume that the tree of concern for the user is to be kept at the domain, example-.com. The user would like this tree to organize and hold their pictures, writings, music, and videos, and so the tree starts out with four corresponding branches, "example.com/pictures", "example.com/writings", "example.com/music", and "example.com/videos". The user may want to divide up their writings into articles and stories; and may want to organize their music by genres such as classical, rock, and pop. Now the tree consists of "example.com/pictures", "example.com/writings", "example.com/writings/articles", "example.com/writings/stories", "example.com/music", "example.com/music/classical", "example.com/music/rock", "example.com/music/pop", and "example.com/videos". Stories might be further broken up by authors, whereas music genres might be divided by artist, and then by album, and so on. The user continues to build out the tree according to this approach until storing the content items as various leaves on each of these branches, where the leaves are identified by their particular titles or captions.

The process for storing nodes and limbs that comprise the complete paths that form the structure of an entire tree is defined by procedure 1, store procedure, as defined on page 44 of this specification. This procedure consists of a sequence of steps performed iteratively by the client on each marker in a path obtained from the user by the client. The first iteration of this procedure is performed by the client to create, and store on the web server, a single node, which serves as the root node and first parent node for subsequent iterations. The root node is distinguished by a root node marker, input by the user when prompted by the client, that is a publicly or well-known text string, such as a domain name from the previous example. The path is initialized to contain the root node marker as the first element. For each subsequent iteration of this procedure the client prompts the user for a new marker input that is to be appended to the path. In response to the input by the user, the client creates and stores on the web server another node, to serve as a child node of the parent node, and a limb that leads from the parent node to the newly created and stored child node. As previously discussed, a parent node is a branch node in the tree, and a child node with no children of its own is a leaf node in the tree. For each node, whether it is a branch node or a leaf node, an information value may be provided by the user when prompted by the client, which is then encrypted by the client to be stored within the node on the web server. In any case, the node value is optional and may be left empty or set to a null value.

Figure 5:
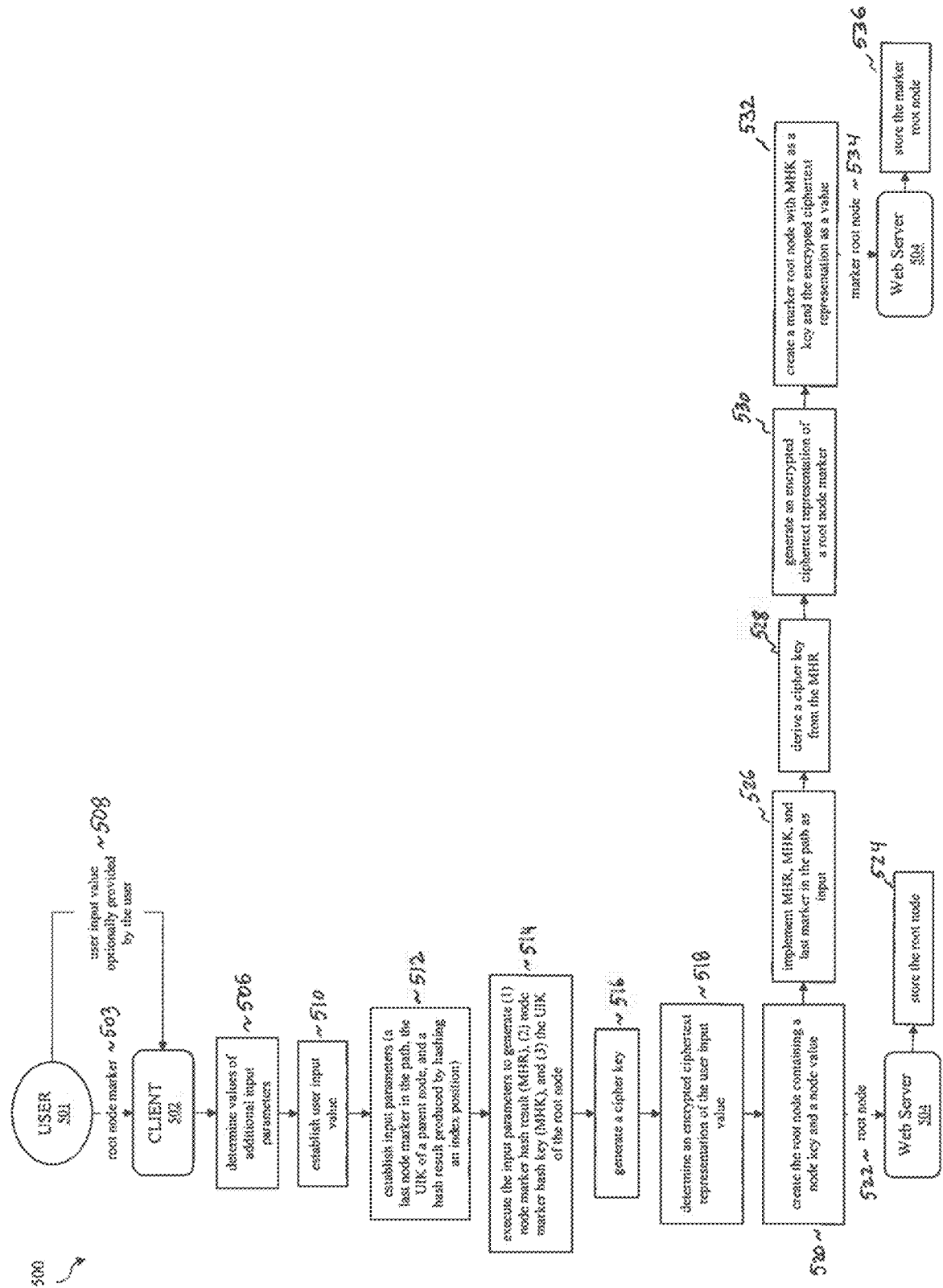
FIG. 5 is a flow diagram illustrating one embodiment of a method to create and store a parent node with data within the system illustrated in FIG. 3.

Referring now to FIG. 5, a block diagram of another embodiment of a method to create and store a node with user data is shown. The storage procedure begins with the root node marker in step 503 as the only element in the path and the first one to be processed for the first iteration. There are two additional input parameters that are necessary for the first iteration. The logic to determine values of these two additional input parameters is embedded within and executed by the client 502 in step 506. The two additional input parameters are: (1) the UIK of the parent node and (2) an index position of the last marker in the path (the index position). These two additional input parameters are equally necessary for the subsequent iterations, albeit that the values of the two additional input parameters vary for each subsequent iteration. So, for the first iteration, the UIK of the parent node is set to an initial value determined by the client 502, and the index position in the path starts with the value of zero (0), because the path contains only the root node marker and therefore there is no parent node. In subsequent iterations, the values for these parameters are provided by each preceding iteration. The client 502 prompts the user 501 for an optional information value (the user input value) to store in the root node. The user 501 may provide the user input value in step 508. The user, however, may omit the value for the root node in which case the user input value is set in step 510 by the client 502 as a null value or empty string. Note that the client prompts the user for the user input value to create each subsequent node in the path of the tree. With each iteration, including the first for the root node, the client creates a new node and stores it on the web server as follows:

The client calculates the UIK of the root node by executing function 2, encode_marker( ), as defined on page 36 of this specification, which takes as input parameters in step 512 the last marker in the path, the UIK of the parent node for this iteration, and a hash result produced by hashing the index position of this iteration. Function 2 returns three values in step 514: (1) marker hash result (MHR), (2) marker hash key (MHK) derived from the MHR, and (3) the unique index key (UIK) of the root node derived from the MHK and the UIK of the parent node. Function 2 relies on the "hash with secret keys" functionality of the CSM to produce the hash results that are used as factors in the UIK calculation. The UIK is directly and uniquely related to the path identifier of the new node, and it is improbable that the path identifier of any other node will result in the same UIK.

Then the client inputs the MHR, UIK, and the user input value to function 5, store_node( ), as defined on page 39 of this specification. Within function 5, the MHR and UIK are input to function 4, derive_node_key( ), as defined on page 38 of this specification, which derives a cipher key in step 516 that is unique to this node. Function 4 relies on the "hash" functionality of the CSM to derive the cipher key. Then the cipher key and the user input value are input to the "encrypt with symmetric cipher key" functionality of the CSM, which returns the encrypted ciphertext representation of the user input value in step 518. The root node is constructed in step 520 from: the UIK as the node key, and the encrypted ciphertext representation as the node value. This new node is then sent in a 'store node request' in step 522 to the web server 504, which verifies that the received node is well formed and unique, and then stores the node in its internal database in step 524. The web server 504 responds with a success code/message, or an error code/message that explains the reason if the request failed.

Next, the client stores the marker of each root node created as a marker node (note, a plurality of root nodes may be created to form a forest) so that the marker can be recalled later when decoding the tree. To do so, the client executes function 6, store_marker( ), as defined on page 41 of this specification, with the MHR, MHK, and last marker in the path as input parameters in step 526. Within function 6, a cipher key that is unique to this marker is derived in step 528 directly from the MHR. Then the cipher key and marker are input to the "encrypt with symmetric cipher key" functionality of the CSM, which returns the encrypted ciphertext representation of the marker in step 530. The new marker node is constructed from the MHK as the key, and the ciphertext as the value in step 532. This new marker node is then sent in a 'store marker node' request in step 534 to the web server, which verifies that the received marker node is well formed, and then stores the marker node in its internal database in step 536. This is an idempotent operation, meaning that repeatedly performing the operation always produces the same result, such that if the marker node already exists, it need not be stored again, but a success message is still returned. If for some other reason the marker node cannot be stored, the web server returns an error code or message indicating the cause of the failure.

Figures 6, 7:
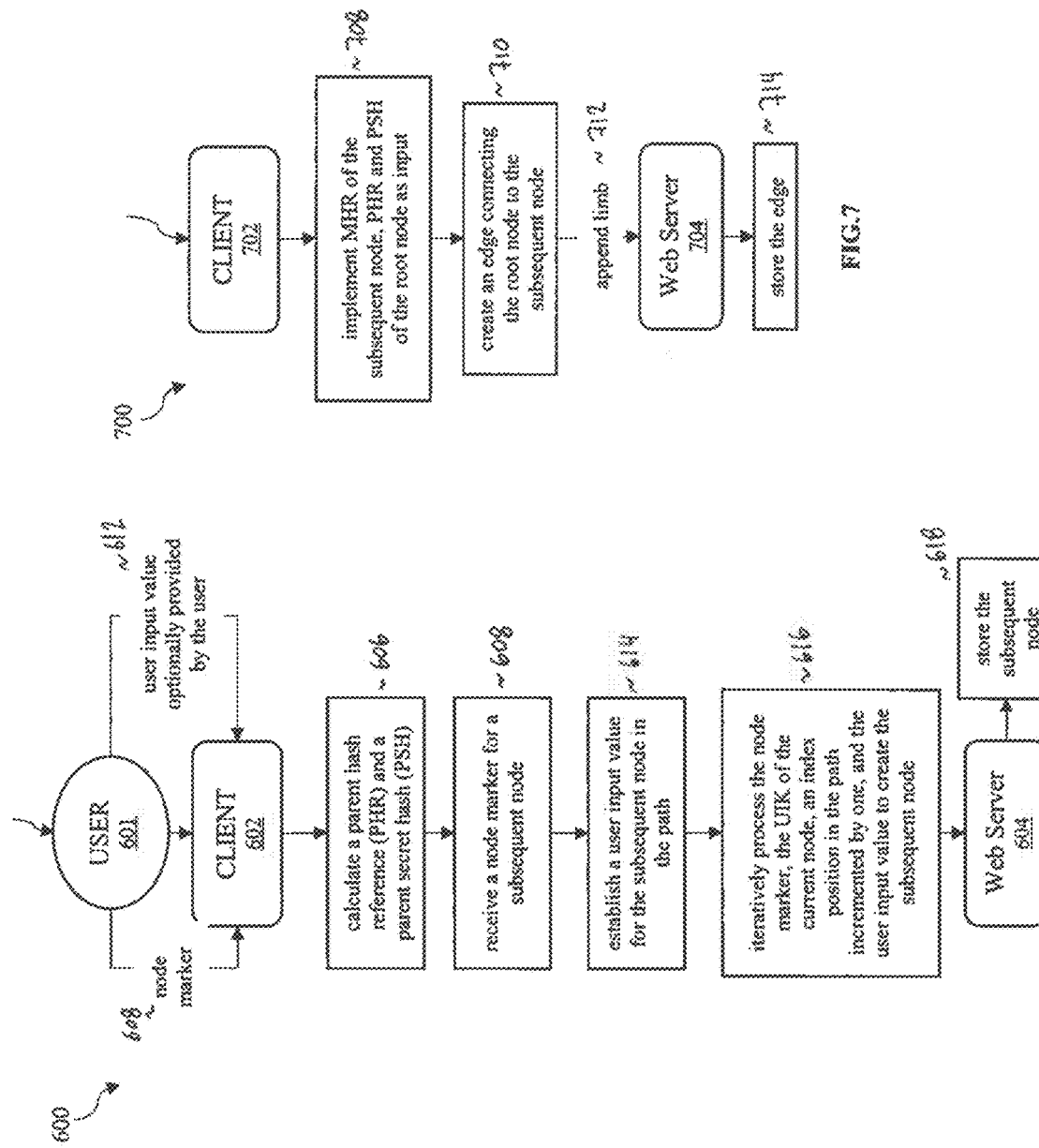
FIG. 6 is a flow diagram illustrating one embodiment of a method to create and store a child node with data within the system illustrated in FIG. 3.
FIG. 7 is a flow diagram illustrating one embodiment of a method to create and store an edge connecting the parent node and the child node within the system illustrated in FIG. 3.

Now turning to FIG. 6, a block diagram of another embodiment of a method to create and store a child node with user data is shown. The client 602 calculates a parent hash reference (PHR) and parent secret hash (PSH) in step 606 by providing the UIK and hash result of the current index position (IHR) as input to function 7, encode_parent( ), as defined on page 42 of this specification. Within function 7, the client relies on the "hash" functionality of the CSM to hash the UIK and IHR to produce the PHR. The client further uses the "hash with secret keys" functionality of the CSM to hash the PHR with both secret key 0 and secret key 1 to produce the PSH. The PHR and PSH are stored in client memory for use in the next iteration of this procedure. The PHR and PSH are variable parameters required to create edges connecting a parent node with one or more subsequent nodes (descendent nodes) in the tree index data structure.

The client then prompts the user 601 to enter a marker in step 608 to identify the next child node in the tree, and the user input value in step 612, if any, to be stored in the new child node. The client appends the new marker to the path. If the user omits the input value, then the client sets it to a null value or an empty string in step 614. Procedure 1 is repeated in step 616 with the newly appended marker as the last marker in the path, the UIK of the current node as the UIK of the parent node for the next iteration, the index position in the path incremented by one, and the new user input value. Each of the created child nodes by the iterative procedure is stored on the web server in step 618.

Referring now to FIG. 7, a block diagram of another embodiment of a method to create and store an edge connecting the parent node and the child node is shown. In each subsequent iteration of procedure 1, following that of the root node, there is an additional step. If the index position is greater than 0, then this is not a root node iteration but instead is a child node iteration, and therefore the client must add the limb that connects the parent node to the new child node. To achieve this, the client 702 executes function 8 in step 708, add_limb( ), as defined on page 43 of this specification, with the current MHR, plus the previously recorded values of PHR and PSH stored in client memory as input. Within function 8, the MHR and the PSH are combined to produce the child hash reference (CHR). Then the new limb is constructed from the PHR and CHR in step 710 and sent in an 'append limb' request in step 712 to the web server 704. The web server 704 validates that the limb is well formed and stores it in step 714 in its internal database. This is an idempotent operation such that if the limb already exists, it need not be stored again, but a success message is still returned. If for some other reason the limb cannot be stored, the web server returns an error code or message indicating the cause of the failure.

The number of iterations of procedure 1 is controlled by the user, continuing periodically as the user creates paths, constituting successive sets of branch nodes and limbs consecutively leading to leaf nodes containing user defined information values (user input values), together comprising a tree data structure, and thereby the user determines the height and width of their tree index through the creation of these paths.

In an alternative embodiment, if a parent path already exists and is known by the client along with the UIK of the parent node, which can be calculated by the client from the parent path, then procedure 1 may begin directly with a new node consisting of a marker and user input value, as prompted from the user by the client, to be added as a child node of the known parent node. The new marker is appended to the parent path. The index position of this last marker in the path is equal to the length of the parent path. The client sets the user input value to null or an empty string if the user omitted this input. The input parameters for procedure 1 in this case are the newly appended marker as the last marker in the path, the UIK of the parent node, the length of the parent path as the index position, and the user input value.

In yet another alternative embodiment, it is possible to store a node at an isolated path that has no known parent connection, in which case the new node is essentially a root node, but the path is not a root node identifier, because is consists of multiple markers. In this case function 3, encode_path( ), as defined on page 37 of this specification, is used in place of function 2 for the first iteration, with the given path as the only input. Function 3 incorporates function 2 to calculate the path index keys for each marker in the path, sequentially. The rest of the steps of procedure 1 may proceed from here to build out a tree from this root path.

Note that, although it is highly unlikely, it is possible that two disparate paths will result in the same unique index key (UIK). There are a variety of possible solutions for this rare case that can be employed without altering the intended functionality and purpose of this invention. One approach is to use a hash bucket created within the database of the web server. The hash bucket holds the multiple nodes that happen to have the same UIK, distinguishing them with an obfuscated version of the marker hash key (MHK) returned by function 3, encode_path( ), as a secondary index key (SIK). The MHK can be obfuscated by hashing it once again with the current index position in the path, thereby producing the obfuscated marker hash key (OMHK). This approach requires that the client include the OMHK in a second 'store node request' sent to the web server in reaction to an error message received from the web server indicating that the node already exists. The second request states that a hash bucket is required using the given OMHK as the SIK. The web server must then create the hash bucket, if not already present due to some previous collision, move the original (preexisting) node into the bucket, and change the value associated with the original UIK to be a reference to the new hash bucket. The existing node requires a SIK in the new hash bucket, though the OMHK is not known for it. In this case, the original UIK can be reused as the SIK in the hash bucket. The new node is then added to the hash bucket with its given OMHK as the SIK.

Recall Procedure

In order to meet the primary objective of this invention, there must be a complimentary process for recalling information from a tree in the forest index. Starting with the same initialization procedures as stated previously, a user can use the client to map out (walk) a particular tree in the forest index using procedure 2, recall procedure, as defined on page 49 of this specification.

Figure 8:
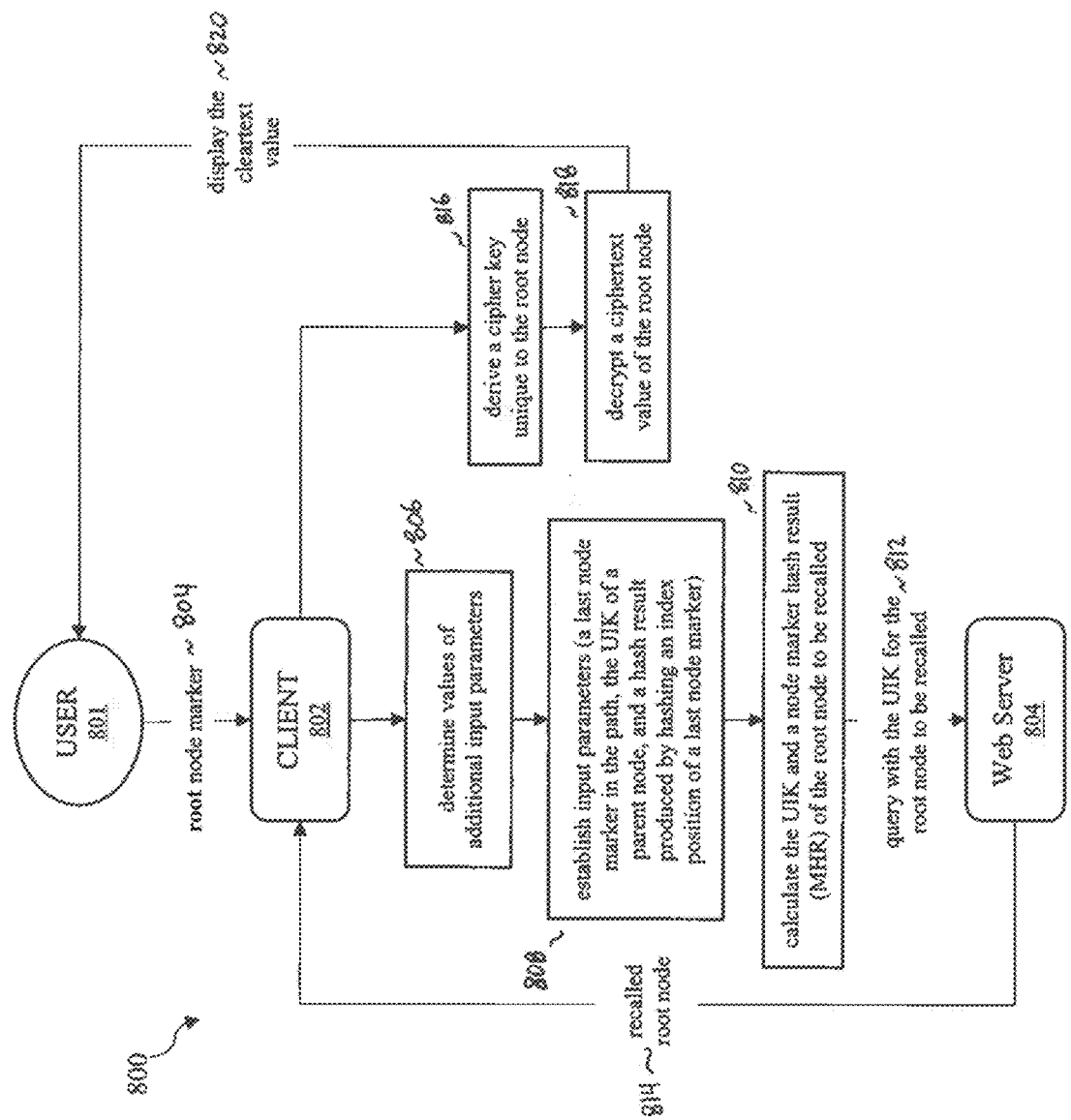
FIG. 8 is a flow diagram illustrating one embodiment of a method to recall the parent node with data stored within the system illustrated in FIG. 3.

Now turning to FIG. 8, a block diagram of another embodiment of a method to recall the parent node with user data stored is shown. As in procedure 1, the recall procedure begins with receiving the root node marker in step 804 from the user 801 as the only element in the path, and establishing by the client the two additional parameters in step 806 that must be set to initial values for the first iteration of procedure 2, where the two additional parameters are: (1) the UIK of the parent node which is set to an initial value determined by the client, and (2) the index position of the last marker in the path (the index position) which starts with the value of zero (0) for the root node marker. Note that, as in procedure 1 (to store data), the values of the two additional input parameters vary for each subsequent iteration.

With each iteration, including the first for the root node, the client is able to recall a node from the web server. The current path is the node marker of the current node. The client 802 calculates the UIK of the current node by executing function 2, encode_marker( ), which takes, in step 808, the following input parameters: the last marker in the path, the UIK of the parent node, and a hash result produced by hashing the index position of the last marker in the path. The client 802 calculates the UIK and the marker hash result (MHR) of the current node (example, root node) in step 810. Note that although function 2 returns three values, the marker hash result (MHR), the marker hash key (MHK), and the unique index key (UIK), as seen in procedure 1, only the MHR and UIK values are used in procedure 2.

Then the client 802 executes function 9, recall_node( ), as defined on page 46 of this specification, in which: the client 802 queries, in step 812, the web server 804 for the node with the UIK returned by function 2. The web server 804 returns the complete node, in step 814, if found, or an explanatory error code/message if not found, or some other exception causing the query to fail. The client 802 derives a cipher key unique to this node in step 816 by executing function 4, derive_node_key( ). With this cipher key the client 802 decrypts, in step 818, a ciphertext value of the node using the "decrypt with symmetric cipher key" functionality of the CSM. The resulting cleartext value is then presented in step 820 by the client 802 to the user 801. If the value presented to the user 801 is the information sought by the user 801, then the user 801 performs no further actions using the client 802 to locate subsequent nodes and the procedure ends here. Otherwise, the procedure continues.

Referring now to FIG. 9, a block diagram of another embodiment of a method to recall an edge connecting the parent node to the child node is shown. The client 902 retrieves any limbs associated with the current node as a parent (branch) node. To do so, the client 902 must produce the obfuscated parent hash reference (PHR) by inputting the UIK of the current node and a hash result produced by hashing the index position of the last marker in the path to function 7, encode_parent( ), Function 7 returns two obfuscated values, the parent hash reference (PHR) and parent secret hash (PSH) in step 906, that are used by the client as input to function 11, recall_child_markers( ), as defined on page 48 of this specification. Within function 11, the client queries in step 908 the web server 904 for the limbs with the given PHR. The web server 904 returns, in step 910, a set of ordered pairs that represent all limbs, which have the given PHR as the first element of the ordered pair. The second value of each ordered pair is the obfuscated child hash reference (CHR). At this point, all of the limbs of the parent node have been identified.

Now turning to FIG. 10, a block diagram of another embodiment of a method to recall a child node with user data stored is shown. In order to determine child markers of the subsequent nodes, the client 1002 inputs PSH and CHR for each CHR in the set of limbs to function 10, recall_marker( ), as defined on page 47 of this specification. Within function 10, the client 1002 decodes the MHR from the PSH and CHR and recalculates the MHK from the MHR in step 1006 by calling the "hash with secret keys" functionality of the CSM, using secret key 1. The client 1002 then queries, in step 1008, the marker node identified by the given MHK from the web server 1004. Upon receiving the marker node in step 1010 from the web server 1004, the client 1002 derives the cipher key in step 1012 from the MHR as input to the CSM function "decrypt with symmetric cipher key" to decrypt the marker node ciphertext value as the cleartext marker in step 1014. Function 10 returns the resulting cleartext marker to function 11, which then appends the cleartext marker in step 1016 to a set of all child markers for the given parent node for each CHR thus processed. The set of child markers is then returned from function 11 and presented, in step 1018, by the client 1002 to the user 1001 in a menu from which the user 1001 may select, in step 1020, the marker that determines the next child node to recall (i.e. follow).

With the user's selection of the next child marker, the marker is appended, in step 1022, to the path. The path is then traversed, in step 1024, by recursively calling the recall( ) function of procedure 2 with the newly appended marker as the last marker in the path, the UIK of the current node as the UIK of the parent node, and the index position incremented by one. This procedure continues iteratively to traverse a path until reaching a leaf node, or if the value sought was not found by the user and the user chooses to return to the preceding iteration, then resumes the previous iteration at the parent (branch) node. Upon returning from each iteration to a parent node, the path is restored to the parent path by subtracting the last marker from the path, and the set of child markers of the parent node are presented once again to the user, such that the user may select a different child marker to traverse and follow the corresponding alternate path within a new iteration of procedure 2. The recursion continues in this manner until either the user identifies a value that matches the information sought or the entire tree has been recalled and displayed, as controlled by the user.

In an alternative embodiment, in the case if the user knows and inputs the complete path to a node to begin with, the client can retrieve the node directly by using function 3, encode_path( ), with the path as input to calculate the UIK and MHR needed to query and decrypt the node with function 9, recall_node( ), and present the cleartext value to the user. If the node has limbs, then the set of child markers for the branch can be recalled by the client with function 11, recall_child_markers( ), and presented to the user in a menu. From here, the user can select a child marker that is appended to the path by the client and follow that path using procedure 2, with the newly appended marker as the last marker in the path, the UIK of the current node as the UIK of the parent node, and the length of the current path as the index position, as inputs to the procedure.

As with solution for handling index key collisions described in the preceding storage procedure, there is an inverse functionality required for detecting and resolving the multiple nodes per index key. This must correspond with whatever solution was used to store the multiple nodes for a single index key. For example, in the case of the proposed hash bucket approach described in the preceding storage procedure, when the client queries a node from the web server that has a hash bucket, the web server returns a message indicating that the hash bucket exists prompting the client to perform a second query that includes the OMHK, as previously defined in the storage procedure. The web server locates and returns the node in the hash bucket having the given OMHK as its SIK. If the given OMHK is not present as a SIK in the hash bucket, then the web server may assume this query is for the original node that was there before the hash bucket was created, and access it with the given node UIK as the SIK.

Information Exchange Procedure

Node data can be exchanged by creating a cryptographic package that will allow the recipient to locate the node and decrypt the value, called a permit. To achieve this, an access object is created by the client of the user (user client), comprising three values, the UIK of the node, the node cipher key, and the cipher algorithm specification. The object is then be encrypted by the user client using standard asymmetric cryptographic techniques for a specific recipient, using that recipient's asymmetric public key, obtained directly from the recipient through a previous communication or a public key infrastructure external to the system of this invention. The resulting package is the permit, which should be sent to the recipient via a secure communications channel, such as secure email, that is external to the system of this invention. Such a permit should only be sent to a trusted recipient.

To access the node information using the permit, the client of a trusted recipient (recipient client) decrypts the permit, using their asymmetric private key, to recover the clear text access object containing the UIK of the node, its corresponding cipher key and the cipher algorithm specification. Then the UIK is sent in a query from the recipient client to the web server, requesting the specified node. The web server replies with the entire node value. The recipient client de-crypts the ciphertext value of the node by inputting the node cipher key and value to the decrypt function identified by the cipher algorithm specification. The recipient client then presents the resulting cleartext to the recipient.

The web server is a suitable intermediary for exchanging node data with untrusted recipients. In this case the web server acts as the trusted recipient of the preceding exchange technique. To achieve this the web server also has access to an internal implementation of the client where the web server acts as the user, performing automated actions encoded into the web server soft-ware. The permit can now be included as the value of a node (called an exchange node) in a public tree of the forest index, where others can locate the node using their own implementation of the client. In this case, when the web server receives the request for an exchange node from an arbitrary client, the web server autonomously performs the actions of the recipient described in the preceding paragraph in order to recall the cleartext value of the node. An ephemeral copy of the exchange node is created by the web server containing the UIK of the exchange node, and the recalled cleartext value of the original node. This ephemeral node is sent in the response to the arbitrary client. The ephemeral node may be cached by the web server for subsequent re-quests, but will eventually be deleted from the web server memory. The web server response should be sent over a secure communication channel (such as transport layer security (TLS)) to the arbitrary client.

This exchange method presents a functional approach to exchanging information stored within the web server database using the forest index of this invention. The aspects of this approach that pertain uniquely to this invention are the client, the web server, and their interaction via the method of this invention, which remain consistent and in accordance with the previously described system component interactions and method. Other aspects of this approach, the asymmetric cryptographic technique, caching, and secure communication channels, may be replaced without altering the functionality or purpose of this invention. Furthermore, this approach may be revised, amended, or enhanced without altering the functionality or purpose of this invention.

Using a Ledger to Maintain Data Integrity

The preeminent threat to the integrity of the system of this invention is the possibility of corruption of the data stored in the nodes and limbs maintained by the web server. As described, there is no mechanism that allows the web server to authorize the source of a request, nor to verify the validity of a request to update or delete a node or limb. As such, the web server relies on the client to enforce its own authentication and validity checks, which is essential and inherent in the design of the method of this invention. The web server only allows store and recall requests. Store requests that are idempotent are ignored, and any other requests that would update (alter) the value of an existing node are denied and handled as errors. Thus, the system of this invention only facilitates the creation and recall of information.

This may not be suitable for all cases. Therefore, this invention may be revised, amended, or enhanced to store nodes using a ledger type methodology. In such a case, node values consist of ledger entries such that a node value is never overwritten (updated) or deleted. Instead new records are added to the ledger with each new record specifying an update, or indicating the node is deleted or empty, as required by an implementation of this invention. Such a ledger constitutes an enhancement made to this invention that does not alter the essential functionality or purpose of this invention.

Note that to fully protect data integrity, it is anticipated that the web server implementation will employ a database system that protects against data loss by guaranteeing data replication and backup.

Detailed Method Overview

The method of this invention defines how information is encoded for storage in the system of this invention, and how information that has been recalled is decoded. This method is described by a series of complex functions unique to this invention. Encoding requires the client to calculate an index key and encrypt the value that comprise a node stored in the key-value-pair database of the web server. Decoding requires the client to calculate an index key to query a node from the web server, and then decrypt the value of the node returned by the web server. The method works the same whether the information is privately maintained or publicly known. The only difference between private and public nodes is in the input to the function for generating the secret keys used in encoding and decoding the data.

Thus, there is a single function (1) for generating the secret keys for encoding and decoding nodes with two input variants regarding the source material, one for private storage and recall, and another for public storage and recall. There is one set of functions (2 and 3) to calculate the hash used as the index key of a node that works the same for both storage and recall. There is a function (4) for deriving the node cipher key used for encrypting and decrypting the value of a node, which also is used the same for both storage and recall. There is a specific function (5) for encrypting and storing a node that has a corollary, inverse function (9) for recalling and decrypting a node, both using the node cipher key. Likewise, there are a pair of similar inverse functions (6 and 10) for storing and recalling a marker. The functions for storing and recalling a marker employ a common function (7) for encoding limbs in a manner that obfuscates both the parent and the child values of the limb, as implemented in the functions (8 and 11) for storing and recalling limbs as well as the associated child markers.

Each function is first rationalized in plain language and then defined in two forms, a mathematical formula, and corresponding pseudo code. These functions are combined in two procedures, one for storing all nodes that make up a path of paths in a tree of the forest index, and a corresponding procedure for traversing paths as well as mapping out entire trees.

Function for Deriving Secret Keys from Binary Data

The implementation of the function used to derive secret keys is not specified by this invention and is instead an implementation detail of the client code. This invention requires that the implemented key derivation method be a deterministic function, guaranteeing that when called repeatedly with the same input, the same result will be produced every time. The function shall accept one parameter being the source data in a size specified array, and an optional second parameter specifying the number of keys to be derived.

Key derivation can be achieved in various ways without altering the functionality, purpose, or claims of this invention. The following examples demonstrate two simple implementations of the key derivation functions as well as providing declarations of these functions for reference purposes in subsequent function descriptions.

FUNCTION: d(x, n); derive_keys(material, n)

Defined:

1. d(x, n): this function that derives n distinct keys from an array of data, x.

Given:

1. x: the source material input as a size-specified array of binary data.
2. n: the number of keys to be derived.

Pseudo-code:

1. derive_keys(material, n):
2. split material into a list of n equal sized pieces
3. return the resulting list of pieces FUNCTION: d(x); derive_key(material)

Defined:

1. d(x): this function that derives 1 distinct key from an array of data, x.

Given:

1. x: the source material input as a size-specified array of binary data.

Pseudo-code:

1. derive_key(material):
2. pieces=derive_keys(material, 1)
3. return piece[0]

Function for Generating Secret Keys

This function is used to generate the secret keys required for storing and recalling information stored in nodes of the forest index of this invention. It produces a set of two secret keys, which are derived from source material, and a corresponding set of identifiers, $\{S_0, S_1\}$. The source material is a set of information values that have been concatenated into a single data value for hashing. The source material is obtained from the user by the client using a series of prompts.

For private storage and recall, the source material is a combination of the user name, the root node marker of the tree, and additional secret information prompted by the client from the user. For public storage and recall, the source material is only the root node marker of the tree, which is a publicly known value, typically the Internet domain name.

A cryptographic hash function is used to produce a hash result from the input to this function. This hash result is called the master key. The algorithm of the hash function should be a certified security standard such as SHA2 or SHA3, such that the resulting credentials are likewise certifiable. Depending on the asymmetric cipher selected by the implementation, such as elliptic-curve, the master key may also be used to derive the public/private key-pair. Other asymmetric ciphers, such as RSA, generate the key-pair randomly in a manner where the master key is not applicable. The master key is then split into two separate keys by the derivation function, derive_keys( ), described in the preceding section.

The following mathematical formula and corresponding pseudo-code describe this function.

FUNCTION 1: α(X); generate_keys(material)

Defined:
1. h( ): a cryptographic hash function provided by the CSM that digests multiple, concatenated input parameters resulting in a large integer b bytes in size.
2. α: is function 1 returning a set of two secret key identifiers, $\{S_0, S_1\}$ Given:
1. X: the source material input obtained from the user.
   1. $X=A\|\Psi\|\Phi$: in the case of secret keys for private storage
      1. A: is the publicly known root node marker (aka domain name) as a text string.
      2. $\Psi$: is the secret name of the user as a text string.
      3. $\Phi$: is the user's combined secrets as a text string.
   2. X=A: in the case of secret keys for public storage
      1. A: is the publicly known root node marker (aka domain name) as a text string.

Formula:
1. $\{S_0, S_1\} := \alpha(X) = d(h(X), 2)$

Pseudo-code:
1. generate_keys(material):
2. declare secret as an empty list, [ ]
3. hash_result=hash(material)
4. secret=derive_keys(hash_result, 2)
5. secret[0] is recorded in the CSM database
6. with secret_0 as its lookup key
7. secret[1] is recorded in the CSM database
8. with secret_1 as its lookup key
9. return {secret_0, secret_1}

Function for Calculating an Index Key (IK) for a Path

This function calculates an index key for a node stored at a given path in the forest. The path is a complete list of all node markers from the root node to the node to be stored, where the first marker in the list is the root node marker, which is typically a domain name, and each subsequent marker is a user defined textual label or image/icon/logo/etc. This function requires the two secret key identifiers produced by the preceding Function for Generating Secret Keys. Using these secret key identifiers, the resulting index key can only be produced by the user client in possession of these secret keys, and so only this user client can locate a node with this index key in the forest index. The location of the node in the forest, and thus its contextual meaning, is undecipherable to anyone else observing such a node.

Each marker in the path must be canonicalized, i.e. normalized to canonical form, being one that will result in a consistent hash result while retaining the unique features of the marker. For example, a canonicalization function may remove leading and trailing whitespace, convert all consecutive internal whitespace characters to a single space character, remove redundant punctuation, etc. The purpose of this is to avoid minor variations that are potentially deceptive features, which might mislead users down an unintended path. This is a canonical marker.

In order to have an indexable key for a node, the path that distinguishes the node in the forest index must be reduced to a numeric value. This is done using a cryptographic hash function. In this case, these methods will be implemented primarily in software, and the hash result is not an authentication credential that must comply with a certifiable security standard. Therefore, the hash function may be selected from those that are more efficient in software implementations, while remaining theoretically secure, having no known theoretic or practical attacks, such as Blake2s.

A canonical marker is hashed twice in succession, one with first secret key, identified by $S_0$, to produce the marker hash result (MHR), which is then hashed with the second secret key, identified by $S_1$, to produce the hash key for the marker, called the marker Hash Key (MHK).

The MHK relates directly to an individual marker in a path. Respectively, a complete path uniquely locates a node within the forest index of this invention. The entire path, including all markers, must be calculated into a hash result that can be used as the unique index key (UIK) of the node at that path.

To calculate a UIK, each successive MHK in the path is combined, iteratively, with the UIK of the parent path to produce the UIK of the current path. Either the exclusive-or (XOR) (formally: exclusive disjunction) operation or a hash function can be used to combing the UIK and MHK. With the XOR operator the hash result of the current index position of the marker in the path must be added into the combination to retain the order of the path list. A reference-list of these index position hash results can be pre-generated and hardcoded into the implementation for greater efficiency.

Below is the rudimentary version of this function for calculating the UIK of a single node, which can be used when the marker of a node, the UIK of its parent node, and the length of that parent node's path are all known. Note that the length of the parent path is the number of markers that precede the node marker and so by the definition of a list is same as the index position of the marker in the complete path.

Note that an n-tuple of three significant variables must be returned by this function, (MHR, MHK, UIK), because all three of these values are required variously by subsequent functions. However, the MHK is calculated from the MHR, and the UIK is calculated from the MHK. This is a combination of a composite function with an n-tuple, for which no known mathematical notation could be found. So this formula uses an informal notation for the n-tuple in order to pass the results of equations in preceding elements to the subsequent elements of the n-tuple.

FUNCTION 2: ν(I, p, x); encode_marker(marker, parent_uik, index_hash)

Defined:
1. h( ): a cryptographic hash function provided by the CSM that digests multiple, concatenated input parameters resulting in a large integer b bytes in size.
2. h'(s, x): a cryptographic hash function provided by the CSM that digests multiple, concatenated input parameters, x, in combination with a secret key identified by a given secret key identifier, s, resulting in a large integer b bytes in size.
3. ⊕: the XOR logical operator.
4. ‖: the concatenation operator.
5. ν: is function 2, which returns a 3-tuple consisting of:
   5.a. R: the marker hash result, MHR.
   5.b. K: the marker hash key, MHK.
   5.c. U: the unique index key, UIK.

Given:
1. $\{S_0, S_1\}$: the previously generated set of secret key identifiers.
2. m: the node marker.
3. p: a previously calculated parent UIK.
4. x: a hash result of the index position.

Formula:
1. Using one of two analogous equations, one using XOR, and one using a hash function without the third parameter, x:
   1.a. $(R, K, U) := v(m, p, x) = (r = h'(S_0, m), k = h'(S_1, r), k \oplus p \oplus x)$
   1.b. $(R, K, U) := v(m, p) = (r = h'(S_0, m), k = h'(S_1, r), h(p\|k))$ Pseudo-code:
1. encode_marker(marker, parent_uik, index_hash):
2. mhr=hash_with_secret(secret_0, marker)
3. mhk=hash_with_secret(secret_1, mhr)
4. uik=mhk$\oplus$parent_uik$\oplus$index_hash
5. return (mhr, mhk, uik)
   where line 4 can be replaced by the following for equation 1.b above and then the index_hash parameter can be ignored/omitted.
   4. uik=hash(parent_uik$\|$mhk)

This rudimentary function to generate a UIK for a single node can be incorporated into an iterative function to generate the UIK for a complete path from the root to the current node. The first marker in the path is that of the initial root node, which has no parent and so the function begins with the parent UIK set to an initial value provided within the client code.

FUNCTION 3: $\Sigma(P)$; encode_path(path)
Defined:
1. $\Sigma$: is function 3, which returns a 3-tuple consisting of:
   1.a. R: the marker hash result, MHR.
   1.b. K: the marker hash key, MHK.
   1.c. U: the unique index key, UIK.
Given:
1. $\Gamma$: a pre-generated list of hashed index values, (h(0), h(1), ..., h(z)), where z is a reasonable maximum path length.
2. P: a list of markers comprising a path, $(m_0, m_1, \ldots, m_n)$, where $n = |P| - 1$.
3. $U_{-1}$=IV a hardcoded initial value, such as 0x36 repeated b times.
Formula:
1. $(R_i, K_i, U_i) := \Sigma(P) = v(m_i, U_{i-1}, \Gamma_i): \forall m_{i=0\ldots n} \in P$
Pseudo-code:

```
1.     index_hash = [for i = 0 to max_path_length: hash(i)]
2.     encode_path(path):
3.         uik = initial_value
4.         n = length(path) - 1
5.         for i = 0 to n:
6.             (mhr, mhk, uik) =
7.                 encode_marker (path[i], uik, index_hash[i])
8.         return (mhr, mhk, uik)
```

Function for Deriving a Unique Cipher Key Per Node

A cipher key that is both seemingly random and unique to a node can be derived from the node's MHR and UIK. With this key derivation functionality a node can be encrypted and decrypted exclusively by one who possesses the secret keys necessary to calculate the UIK of the node.

This function can use either a hash function to combine the two values, or an XOR operation. The hash function is more secure and the XOR is more efficient, though theoretically still secure because only the user who produced the UIK can know MHR, and both are pseudo-random values with no meaning or pattern.

FUNCTION 4: $\kappa(R, U)$; derive_node_key(mhr, uik)
Defined:
1. c: the key size in bytes of an encryption function that implements a well known cipher algorithm such as AES256.
2. h( ): a cryptographic hash function provided by the CSM that digests multiple input parameters resulting in a large integer b bytes in size.
3. $\oplus$: the XOR logical operator.
4. $\|$: the concatenation operator.
5. $\kappa$: is function 4, returning the derived key value.
Given:
1. The results from calculating the UIK of the node, using either encode_marker( ) or encode_path( ), particularly:
   1.a. R: is the intermediate hash result, MHR.
   1.b. U: is the resulting UIK
Formula:
1. One of two analogous equations, one using a hash function, and one using XOR:
   1.a. $\kappa(R, U) = d(h(R\|U))$
   1.b. $\kappa(R, U) = d(R \oplus U)$
Pseudo-code:
1. derive_node_key(mhr, uik):
2. return derive_key(hash(mhr, uik))
   where line 2 can be replaced by the following for equation 1.b above.
   2. return derive_key(mhr$\oplus$uik)

Function for Storing a Node

To store a node in a manner that protects its confidentiality, it is encrypted using the cipher key derived from function 4, derive_node_key( ). The new node is constructed from: the UIK as the node key, and the encrypted ciphertext as the node value, which is then sent by the client to the web server in a request to have the node stored.

FUNCTION 5: $\delta(R, U, V)$; store_node(mhr, uik, value)
Defined:
1. e( ): an encryption function provided by the CSM that implements a well known cipher algorithm such as AES256, having a key size that is c bytes in size.
2. $\Omega$: represents node storage as a map subscripted by the index key to which the encrypted value is assigned; aka send_node( ).
3. $\delta$: is function 5, which stores the resulting node in the node database on the web server represented by $\Omega$.
Given:
1. The results from calculating the UIK of the node, using either encode_marker( ) or encode_path( ), particularly:
   5.d. R: is the intermediate hash result MHR.
   5.e. U: is the resulting UIK.
2. V: is the cleartext value to be stored in the node.
Formula:
1. $\delta(R, U, V) = \{\Omega_U := e(\kappa(R, U), V)\}$
Pseudo-code:
1. store_node(mhr, uik, value):
2. unique_key=derive_node_key(mhr, uik)
3. encrypted_value=encrypt(unique_key, value)
4. send_node({uik: encrypted_value})

Function for Storing a Marker Node Markers must be stored in the forest index on the web server to allow lookups when searching and traversing the forest index. A marker is stored as an isolated node, separate from the corresponding tree(s), where the marker solely constitutes both the path to the node and its encrypted value. This special purpose node is called a marker node. The MHK calculated from the marker is used directly as the UIK of the marker node.

Notice that there may be many nodes with the same marker appearing in different paths. All will produce the same marker node. Therefore, this is an idempotent function, meaning that storing the marker node repeatedly is identical to storing it once and subsequent store requests can simply be ignored. Preferably, the function call will be ignored by the client, assuming the client's knowledge of the existing marker, in order to avoid unnecessary messages between the client and web server.

This function is nearly identical to Function 5 for storing nodes. However, because of the idempotent nature of this function and a minor difference in how the key is generated, this must be defined as a separate function as follows:

FUNCTION 6: $\varepsilon(R, K, m)$; store_marker(mhr, mhk, marker)
Defined:
1. $e'( )$: a decryption function provided by the CSM as the inverse of $e( )$ as previously defined.
2. $\Omega_t$: represents marker node storage as a map subscripted by the index key to which the encrypted marker is assigned if it does not already exist; aka send_marker( ).
3. $\varepsilon$: is function 6, which stores the resulting node in the node database on the web server represented by $\Omega$.

Given:
1. m: is the marker.
2. The results from calculating the UIK of the node, using either encode_marker( ) or encode_path( ), particularly:
   2.a. R: is the marker hash result MHR.
   2.b. K: is the marker hash key MHK.

Formula:
1. $\varepsilon(R, K, m) = \{\Omega_{t_K} := e(d(R), m)\}$

Pseudo-code:
1. store_marker(mhr, mhk, marker):
2. marker_key=derive_key(mhr)
3. encrypted_marker=encrypt(marker_key, marker)
4. send_marker({mhk: encrypted_marker})

Function for Storing a Limb

Once the marker node has been established, then a reference to it must be associated with the parent node by creating and storing a limb in the web server database. A limb connects a parent node to a child node and is recorded as an ordered pair consisting of an obfuscated parent UIK and an obfuscated MHK.

The parent UIK is obfuscated by hashing the parent UIK with the hash result of hashing the index position of the child node marker in the path. This hash result is referred to as the parent hash reference (PHR).

The IK of the marker node must be obfuscated in a manner that is recoverable. Instead of the marker's UIK, the MHR is obfuscated and stored as the second value of the limb ordered pair, such that later, from this the MHR can be deciphered and used to calculate the MHK as used for the marker UIK. To obfuscate the MHR a hash result of hashing the PHR in combination with the secret keys identified by, $S_0$ and $S_1$. This hash of the PHR is referred to as the parent secret hash (PSH). The PHS is XOR'ed with the MHR, with the resulting value referred to as the child hash reference (CHR).

Thus, a limb within the system of this invention is an ordered pair of keys, (PHR, CHR), stored as records uniquely indexed on this combined key pair. (Note that an ordered pair is an n-tuple of two elements, which is the same structure as a key-value-pair, with the only functional difference being that in this case the two values are combined for the unique key of the record in the database.) Though it is unlikely, if an identical limb already exists for a request to add a new limb, the request can be ignored as an idempotent action.

This functionality is separated into two functions for improved efficiency. The parent UIK can be encoded into the PHR and PSH once while the UIK of the parent is being calculated, and then reused for calculating the CHR as each child UIK is calculated. This will significantly reduce the number of hash operations.

The following mathematical formula and corresponding pseudo-code describe the function for calculating the PHR and PSH for a parent UIK:

FUNCTION 7: $\mu(U, x)$; encode_parent(parent_uik, index_hash)
Defined:
1. $h( )$: a cryptographic hash function provided by the CSM that digests multiple, concatenated input parameters resulting in a large integer b bytes in size.
2. $h''(s_0, s_1, x)$: a cryptographic hash function provided by the CSM that digests multiple, concatenated input parameters, x, in combination with two secret keys identified by given secret key identifiers, $s_0$ and $s_1$, resulting in a large integer b bytes in size.
3. $\|$: the concatenation operator.
4. $\mu$: is function 7, which returns a 2-tuple containing:
   4.a. (U'): the PHR calculated from the given UIK
   4.b. (U''): the PSH calculated from the PHR.

Given:
1. i: is the length of the parent path.
2. U: is the parent UIK.
3. $x = h(i)$ Formula:
1. $(U', U'') := \mu(U, x) = (u' := h(U\|x), h''(S_0, S_1, u'))$ Pseudo-code:
1. encode_parent(parent_uik, index_hash):
2. phr=hash(parent_uik∥index_hash)
3. psh=hash_with_keys(secret_0, secret_1, phr)
4. return (phr, psh)

The following mathematical formula and corresponding pseudo-code describe the function for generating a limb (aka breadcrumb), which is then sent to the web server for storage:

FUNCTION 8: $\lambda(R, U_{i-1}', U_{i-1}'')$; add_limb(mhr, phr, psh)
Defined:
1. $\omega$: represents storage for limbs as a map subscripted with the parent hash reference (PHR), holding an array of limbs that are each unique based on the child hash reference (CHR); aka append_limb( ).
2. ++: is the list concatenation operator, taking either a list or single element as either operand, resulting in a list combining both operands.
3. $\oplus$: the XOR logical operator.
4. $\lambda$: is function 8, storing the resulting limb in the limb database on the web server represented by $\omega$.

Given:
1. R: is the intermediate hash result MHR for the child node, from either encode_marker( ) or encode_path( )
2. i: is the index of the current marker in the path.
3. $U_{i-1}'$: is PHR of the parent UIK.
4. $U_{i-1}''$: is PSH of the parent UIK.

Formula:
1. $\lambda(R, U_{i-1}', U_{i-1}'') = \{\omega_{U_{i-1}'} := \omega_{U_{i-1}'} ++ (R \oplus U_{i-1}'')\}$ Pseudo-code:
1. add_limb(mhr, phr, psh):
2. chr=mhr$\oplus$psh
3. append_limb(phr, chr)

Procedure for Storing All Nodes in a Path

This summary procedure will combine the preceding functions to define how a path is created and stored from beginning to end. Each step of the way, the node at the current point in the path must be created, along with its marker node and leading limb. Each node potentially contains a value, which should be a placeholder at minimum.

This procedure can be used to interactively build out a path and tree by allowing the user to add a new marker to the path at the completion of each iteration.

This formula and pseudo-code depend on the previous definitions and functions, which are referenced but not restated here.

PROCEDURE 1: STORE PROCEDURE

Given:
1. P: a list of markers constituting a path, ($m_0$, $m_1$, ..., $m_n$), where n=|P|−1.
2. $\Gamma$: a pre-generated list of hashed index values, (h(0), h(1), ..., h(z)), where z is a reasonable maximum path length.
3. $V_0, V_1, \ldots, V_n$: a series of values corresponding to the markers in path P, to be stored in each resulting node respectively.
4. $U_{-1}$=IV: a hardcoded initial value, such as 0x36 repeated b times.

| Formula: | | |
|---|---|---|
| 1. | $\forall m_{i=0..n} \in P$ : | Func. 3 excerpt |
| 2. | $(R_i, K_i, U_i) := \upsilon(m_i, U_{i-1}, \Gamma_i)$ | Func. 2 |
| 3. | $\delta(R_i, U_i, V_i)$ | Func. 5° 4 |
| 4. | $\varepsilon(R_i, K_i, m_i)$ | Func. 6 |
| 5. | $(U'_i, U''_i) := \mu(U_i, \Gamma_i)$ | Func. 7 |
| 6. | $\lambda(R, U'_{i-1}, U''_{i-1}) : i > 0$ | Func. 8 |

Note that formula steps 3, 4, and 5, can be rearranged without altering the outcome of this procedure.

Pseudo-code:

```
1.   index hash = [for i = 0 to max path length: hash(i)]
2.   store(path, values)
3.     declare phr and psh as empty lists
4.     uik = [initial_value]
5.     n = length(path) − 1
6.     for i = 0 to n:
7.       (mhr, mhk, uik[i+1]) =
8.         encode_marker(path[i], uik[i], index_hash[i])
9.       store_node(mhr, uik[i+1], value[i])
10.      store_marker(mhr, mhk, path[i])
11.      (phr[i], psh[i]) =
12.        encode_parent(uik[i+1], index hash[i])
13.      if i > 0:
14.        add_limb(mhr, phr[i−1], psh[i−1])
```

Function for Recalling a Node

The client functionality for recalling a node is similar to that of storing a node, and is the inverse function of node storage. First the function for calculating an index key for a path (either function encode_marker( ) or encode_path( )) is used to generate the UIK, MHK, and MHR of a node. The UIK is sent by the client to the web server in a query to retrieve the node with the given UIK. The web server responds with a message containing the requested node (key and encrypted value.) The unique node key is derived from the MHR and UIK values using function derive_node_key( ). This ephemeral key is then used to decrypt the node value in a decrypt( ) function that is the inverse of the encrypt( ) function used in storing a node.

FUNCTION 9: $\delta'(R, U)$; recall_node(mhr, uik) inverse of Function 5: $\delta(R, U, V)$ Defined:
1. e'( ): a decryption function provided by the CSM as the inverse of e( ) as previously defined.
2. $\Omega'$: represents node storage as a list subscripted by the index key and returning the encrypted value, aka retrieve_node( ).
3. $\delta'$: is function 9, returning the cleartext value V.

Given:
1. R: is the intermediate hash result MHR returned from either encode_marker( ) or encode_path( ).
2. U: is the UIK of the node to be recalled from the web server.

Formula:
1. $V := \delta'(R, U) = e'(\kappa(R, U), \Omega'_U)$

Pseudo-code:
```
1. recall_node(mhr, uik):
2.   encrypted_value=retrieve_node(uik)
3.   unique_key=derive_node_key(mhr, uik)
4.   value=decrypt(unique_key, encrypted_value)
5.   return value
```

Function for Recalling Child Markers for a Node

Given a known path to a node, it is possible to recall and decode the obfuscated markers for all child nodes recorded as reference limbs (breadcrumbs). The UIK of the parent node can be calculated as above with the function for calculating an index key for a path (either Function 2, encode_marker( ), or Function 3, encode_path( )). Furthermore, the PHR and PSH can be calculated from the UIK with Function 7, encode_parent( ). The PHR is sent to the web server in a query asking for all limbs related to this parent node. The server responds with a list of all related child reference hashes (CHRs). For each CHR, the client can calculate the UIK of the corresponding marker node, as the MHK derived from CHR XOR PSH. Each node marker can then be recalled as above using the function for recalling a node and then presented to the user for selection.

Two functions must be defined here, one to recall (dereference) a single reference limb (breadcrumb), and a second function that incorporates the first function to iteratively dereference all limbs for the known parent node in order to present the user with a list of the child markers, as branch limbs in the tree.

The following mathematical formula and corresponding pseudo-code describe the function for recalling a single limb (breadcrumb):

FUNCTION 10: $\varepsilon'(U'', C'')$; recall_marker(psh, chr) inverse of Function 6: $\varepsilon(R, K, m)$ Defined:
1. e'( ): a decryption function as the inverse of e( ) as previously defined.
2. h'(s, x): a cryptographic hash function provided by the CSM that digests multiple, concatenated input parameters, x, in combination with a secret key identified by a given secret key identifier, s, resulting in a large integer b bytes in size.
3. $\Omega'$: represents node storage as a list subscripted by the index key and returning the encrypted value, aka retrieve_node( ).
4. $\varepsilon'$: is function 10, returning the cleartext marker, m.

Given:
1. $\{S_0, S_1\}$: is the set of previously obtained secret key identifiers.
2. U'': is the PSH, as the hash of the PHR, which is the hash of the parent UIK.
3. C': is the obfuscated child hash reference, CHR.

Formula:
1. $f(R) = e'(d(R), \Omega_{h'(S_1,R)}')$
2. $m := \varepsilon'(U'', C') = f(U'' \oplus C')$ Pseudo-code:
1. recall_marker(psh, chr):
2. mhr=psh⊕chr
3. mhk=hash_with_key(secret_1, mhr)
4. marker_key=derive_key(mhr)
5. encrypted_marker=recall_node(mhk)
6. marker=decrypt(marker_key, encrypted_marker)
7. return marker The following mathematical formula and corresponding pseudo-code describe the function for iteratively producing a set of markers for all limbs of the given parent node:
FUNCTION 11: B(U', U''); recall_child_markers(phr, psh)

Defined:
1. $\omega'$: represents limb storage as a list subscripted with the parent hash reference (PHR) and returning an array of limbs that are each unique based on the child hash reference (CHR), aka recall_limbs( ).
2. B: is function 11 resulting in a set of child markers (aka breadcrumbs), $\{m_0, m_1, \ldots, m_n\}$, presented as a menu to the user Given:
1. U': is the PHR, which is the hash of the parent UIK.
2. U'': is the PSH, as the hash of the PHR.

Formula:
1. $B(U', U'') = \{\varepsilon'(U'', m'): \forall m' \in \omega_{U'}\}$ Pseudo-code:
1. recall_child_markers(phr, psh):
2. declare child_markers as an empty set
3. limbs=recall_limbs(phr)
4. foreach chr in limbs:
5. marker=recall_marker(psh, chr)
6. add marker to child_markers
7. return child_markers Procedure for Traversing Paths to Recall Values This procedure illustrates how paths and trees can be reconstructed on the client and thus traversed with minimal prior knowledge. The root node marker of every tree is a well-known value, such as an Internet domain name. Given that the secret keys have been retained locally in the client component, this root node marker is the only additional information that is needed to begin the process of locating the nodes in the tree. With the secret keys and this marker, the root node UIK can be generated along with its MHR and MHK by executing either Function 2, encode_marker( ), or Function 3, encode_path( ). Furthermore, the PHR and PSH can be calculated from the UIK with function 7, encode_parent( ). The PHR is sent by the client to the web server in a query asking for all limbs and child markers (aka breadcrumbs) related to this root node. These markers are then presented to the user, who must select the next market in the path to follow. Given the parent UIK, and the marker, the client can calculate the UIK of the child node with function 2, encode_marker( ). Again, assuming the child node is itself may be a parent node, the child node's PRH can be calculated from the UIK with function 7, encode_parent( ). The child node can then be recalled with the UIK and the next set of limbs can be queried with the PRH and the process repeats, recursively, until the user selects a final node to recall.

This is presented as a synopsis of the entire procedure that is similar to Synopsis 1 in that it depends on the previous definitions and functions, which are referenced but not restated here.

PROCEDURE 2: RECALL PROCEDURE

Defined:
1. Π: is procedure 2 defined as a recursive function.
2. $\delta''(R, K, U) = \delta''(R, U)$: is a wrapper function that is composed of function 9, recall_node( ), for the purpose of stripping off variable K as provided by the calling outer function defined below.

Given:
1. A: is the root node marker(aka domain name) as a text string.
2. Γ: a pre-generated list of hashed index values, (h(0), h(1), ..., h(z)), where z is a reasonable maximum path length.
3. p: is the parent UIK initialized to a hardcoded initial value, such as 0x36 repeated b times.
4. X: is the value sought, as decided by the user.
5. M: is the marker of the next node to recall initialized to A.
6. j: is the current index in the path initialized to 0.
7. m: here represents a marker in the subset of selected branches, b.

Formula:
1. This recursive function iterates on the subset of branches of the current node selected by the user, $b \subseteq B(\ldots)$. With each round, the user might add to b or change the value of X.

$$\prod(M, p, j) = \begin{cases} V & \text{if } X = V := \delta''((R, K, U) := \upsilon(m, P, \Gamma_j)) \\ \prod(m, U, j+1): \forall m \in b & \text{if } b \subseteq B(\mu(U, \Gamma_j)) \end{cases}$$

Pseudo-code:

| | |
|---|---|
| 1. | index_hash = [for i = 0 to max_path_length: hash(i)] |
| 2. | recall(marker, parent_uik, position): |
| 3. | default parent_uik = initial_value |
| 4. | default position = 0 |
| 5. | x = index_hash[position] |
| 6. | (mhr, mhk, uik) = |
| 7. | encode_marker(marker, parent_uik, x) |
| 8. | value = recall_node(mhr, uik) |
| 9. | child_markers = |
| 10. | recall_child_markers(encode_parent(uik, x)) |
| 11. | present value to user |
| 12. | if value is the value sought by user: |
| 13. | return value |
| 14. | present child_markers to user for selection |
| 15. | for each marker in user selected child_markers: |
| 16. | return recall(marker, uik, position + 1) |

It is contemplated that in some embodiments, any of the methods or techniques described above may be implemented as program instructions and data capable of being stored or conveyed via a tangible, computer-accessible storage medium. Such methods or techniques may include, for example and without limitation, the functions described above. Such methods or techniques may further include any of the methods illustrated in FIGS. 4-10 and any suitable variations thereof. Such program instructions may be executed to perform a particular computational function, such as a particular method or portion of a method described above, as well as to provide more general operating system functionality, application functionality, and/or any other suitable functions. It is noted that in some embodiments, components or methods described above as distinct may in other embodiments be integrated into fewer entities than those shown, or functionality may be partitioned differently across components or methods from the partitioning described above.

It is further contemplated that in various embodiments, one or more portions of the methods and mechanisms described herein may form part of a cloud-computing environment.

Changes and modifications in the specifically described embodiments may be carried out without departing from the principles of the present invention, which is intended to be limited only by the scope of the appended claims, as interpreted according to the principles of patent law including the doctrine of equivalents.

Although the embodiments above have been described in considerable detail, numerous variations and modifications will become apparent to those skilled in the art once the above disclosure is fully appreciated. It is intended that the following claims be interpreted to embrace all such variations and modifications.

The embodiments of the invention in which an exclusive property or privilege is claimed are defined as follows:

1. A system for securely indexing data in a tree index data structure, the system comprising:
   a user computing device of a user, the user computing device including a processor and a computer-readable storage medium, the computer-readable storage medium including browser-implemented program instructions;
   a client for accessing a server via a network and for executing the browser-implemented program instructions stored on the computer-readable storage medium, wherein the client, to create one or more nodes within which to store data, is configured to:
   obtain from the user an input parameter comprising one or more node markers in a path to create one or more nodes of the tree index data structure;
   determine values of additional input parameters for iteration of the one or more node markers, the additional input parameters being (1) a unique index key (UIK) of a parent node of the one or more nodes and (2) an index position of a last node marker in the path, wherein the values of the additional input parameters vary for each iteration of the one or more node markers; and
   establish a user input value, wherein the user input value is received by the client from the user or set by the client in response to the user not providing the user input value;
   wherein the client, to recall data stored in the tree index data structure, is configured to:
   obtain from the user the one or more node markers in the path to recall the one or more nodes of the tree index data structure; and
   determine values of the additional input parameters for iteration of the one or more node markers, the additional input parameters being (1) the unique index key (UIK) of the parent node and (2) the index position of the last node marker in the path;
   a security module for interfacing with the client, providing secure storage of cryptographic credentials of the user, the cryptographic credentials comprising identity, secret keys, and public-private key-pair, and for executing cryptographic functions by employing the secret keys,
   wherein the cryptographic functions include hash and cipher functionalities of the security module;
   a web server for providing an application programming interface (API) for storing data in database and recalling the data from the database; and
   a directory server for directing the client to the web server;
   wherein the directory server or the web server provides cryptographic parameters for hashing and ciphering, and the cryptographic parameters are used by the browser-based application and executed by the client; and
   wherein the client is configured to:
   initialize the client to determine the web server, the cryptographic parameters, and the cryptographic credentials; and
   securely store the data in the tree index data structure by executing a sequence of iterative steps, or securely recall the data stored in the tree index data structure by executing a sequence of iterative steps.

2. The system of claim 1, wherein the system, to perform the initialization of the client, is further configured to:
   receive by the client a root node marker of the tree index, wherein the root node marker is input by the user;
   apply the root node marker by the client to query the directory server;
   search by the directory server an internal database to locate data values associated with the root node marker, the data values comprising the web server Internet address and cryptographic parameters for hashing and ciphering;
   query by the client the security module for credentials of the user, the credentials comprising identity of the user, one or more secret keys, and public-private key-pair;
   in response to the query, receive by the client the identity of the user, one or more secret key identifiers, and a public key; and
   in response to a notification by the security module that the credentials do not exist, prompting the user by the client for an input used by the security module to create the credentials.

3. The system of claim 1, wherein the security module comprises a software module.

4. The system of claim 1, wherein the client, to create the one or more nodes within which to store the data, is further configured to:
   establish input parameters comprising the last node marker in the path, the UIK of the parent node, and a hash result produced by hashing the index position; and
   execute the input parameters to generate (1) a node marker hash result (MHR) of the one or more nodes, (2) a node marker hash key (MHK) of the one or more nodes, wherein the MHK is derived from the MHR, and (3) the UIK of the one or more nodes, wherein the UIK of the one or more nodes is derived from the MHK and the UIK of the parent node, and wherein the UIK of the one or more nodes is unique to the path.

5. The system of claim 4, wherein the client, to create the one or more nodes within which to store the data, is further configured to:
   generate, via the security module, a cipher key by implementing the MHR and the UIK of the one or more nodes as an input, wherein the cipher key is unique to each of the one or more nodes being created;
   determine, via the security module, an encrypted ciphertext representation of the user input value by implementing the cipher key and the user input value as another input;
   create the one or more nodes, the one or more nodes comprising a node key and a node value, wherein the node key is the UIK of the one or more nodes and the node value is the encrypted ciphertext representation; and store the one or more nodes on the web server.

6. The system of claim 5, wherein the client is further configured to:
implement the MHR, the MHK, and the last node marker in the path as a further input to create one or more marker nodes corresponding to the one or more nodes;
derive another cipher key from the MHR for the one or more marker nodes;
generate, via the security module, an encrypted ciphertext representation of one or more node markers;
create the one or more marker nodes with the MHK as the one or more marker nodes' key and the encrypted ciphertext representation as the one or more marker nodes' value;
transmit the one or more marker nodes to the web server for verification; and
store on the web server the one or more marker nodes for each corresponding node of the one or more nodes created.

7. The system of claim 5, wherein the client, to create one or more subsequent nodes, is further configured to:
calculate, via the security module, a parent hash reference (PHR) and parent secret hash (PSH), and store the PHR and the PSH within memory of the client;
prompt the user to input the one or more node markers for the one or more subsequent nodes in the path;
receive the one or more node markers from the user;
establish a subsequent user input value for the one or more subsequent nodes in the path, wherein the subsequent user input value is received by the client from the user or set by the client in response to the user not providing the subsequent user input value;
iteratively process the one or more node markers, the UIK of the one or more nodes, an index position in the path incremented by one, and the user input value to create the one or more subsequent nodes forming the tree index data structure; and store the one or more subsequent nodes on the web server.

8. The system of claim 7, wherein the client, to create the one or more subsequent nodes, is further configured to:
implement the MHR of the one or more subsequent nodes, the PHR and the PSH of the one or more nodes as additional inputs, wherein the MHR and the PSH are combined to produce a child hash reference (CHR);
create one or more edges connecting the one or more nodes to the one or more subsequent nodes by constructing the one or more edges from the PHR and the CHR; and
store the one or more edges on the web server.

9. The system of claim 1, wherein the client, to recall the data stored in the tree index data structure, is further configured to:
establish additional input parameters, the additional input parameters comprising a last node marker in the path, the UIK of the parent node, and a hash result produced by hashing the index position of the last node marker in the path;
calculate the UIK and a node marker hash result (MHR) of the one or more nodes to be recalled by implementing the additional input parameters as input.

10. The system of claim 9, wherein the client, to recall the data stored in the tree index data structure, is further configured to:
implement the UIK of the one or more nodes to query the web server for the one or more nodes;
receive from the web server the one or more nodes;
derive a cipher key unique to the one or more nodes;
decrypt, via the security module, a ciphertext value of the one or more nodes; and
display the cleartext value to the user.

11. The system of claim 10, wherein the client, to recall the data stored in the tree index data structure, is further configured to:
implement the UIK of the one or more nodes and the hash result produced by hashing the index position of the last node marker in the path to generate obfuscated values for a parent hash reference (PHR) and a parent secret hash (PSH);
query the web server for one or more edges associated with the PHR; and
receive from the web server one or more ordered pairs representing the one or more edges associated with the PHR, wherein the PHR is a first element of the one or more ordered pairs and an obfuscated child hash reference (CHR) is a second element of the one or more ordered pairs.

12. The system of claim 11, wherein the client, to recall the data stored in the tree index data structure, is further configured to:
implement the PSH and the CHR for each of the one or more ordered pairs to decode the MHR of one or more subsequent nodes;
recalculate, via the security module, a node marker hash key (MHK) of the one or more subsequent nodes;
query the web server for one or more marker nodes associated with the MHK; upon receipt of the one or more marker nodes, derive, via the security module, a cipher key from the MHR to decrypt a marker node ciphertext value as a cleartext node marker;
append the cleartext node marker to one or more subsequent node markers;
display the one or more subsequent node markers to the user;
receive a selection of at least one subsequent node marker from the user;
append the at least one subsequent node marker to the path;
implement as input (1) the one or more subsequent node markers as a last node marker in the path, (2) the UIK of the one or more node markers as the UIK of the parent node, and (3) an index position in the path incremented by one to iteratively traverse the path to reach at least one subsequent node.

13. A method for securely indexing data in a tree index data structure, the method comprising:
initializing a client to determine a web server, cryptographic parameters, and cryptographic credentials;
providing, via a directory server or the web server, the cryptographic parameters for hashing and ciphering, wherein the cryptographic parameters are used by a browser-based application and executed by the client;
providing, via a security module for interfacing with the client, secure storage of the cryptographic credentials of a user, the cryptographic credentials comprising an identity, secret keys, and a public-private key-pair;
executing, via the security module, cryptographic functions by employing the secret keys, wherein the cryptographic functions include hash and cipher functionalities of the security module;
obtaining, by the client, from the user, an input parameter comprising one or more node markers in a path to create one or more nodes of the tree index data structure;

determining, by the client, values of additional input parameters for iteration of the one or more node markers, the additional input parameters being (1) a unique index key (UIK) of a parent node of the one or more nodes and (2) an index position of a last node marker in the path, wherein the values of the additional input parameters vary for each iteration of the one or more node markers;

establishing, by the client, a user input value, wherein the user input value is received by the client from the user or set by the client in response to the user not providing the user input value; and recalling data stored in the tree index data structure by:
obtaining, from the user, the one or more node markers in the path to recall the one or more nodes of the tree index data structure; and determining values of the additional input parameters for iteration of the one or more node markers, the additional input parameters being (1) the unique index key (UIK) of the parent node and (2) the index position of the last node marker in the path; and securely storing the data in the tree index data structure by executing a sequence of iterative steps, or securely recalling the data stored in the tree index data structure by executing a sequence of iterative steps.

14. The method of claim 13, wherein initializing the client comprises:
receiving, by the client, a root node marker of the tree index, wherein the root node marker is input by the user;
applying, by the client, the root node marker to query the directory server;
searching, by the directory server, to locate data values associated with the root node marker;
querying, by the client, for the cryptographic credentials of the user,
in response to the query, receiving, by the client, the identity of the user, one or more secret key identifiers, and a public key; and
in response to a notification that the credentials do not exist, prompting, by the client, the user for an input to create the credentials.

15. The method of claim 13, wherein the additional input parameters further comprise a hash result produced by hashing an index position of the one or more node markers, wherein the method further comprises; executing, by the client, the additional input parameters to generate (1) a node marker hash result (MHR) of the one or more nodes, (2) a marker hash key (MHK) of the one or more nodes, and (3) a UIK of the one or more nodes.

16. The method as recited in claim 15, further comprising:
generating, by the client via the security module, a cipher key by implementing the MHR and the UIK of the one or more nodes as another input;
determining, by the client via the security module, an encrypted ciphertext representation of the user input value by implementing the cipher key and the user input value as a further input;
creating, by the client, the one or more nodes, the one or more nodes comprising a node key and a node value;
creating, by the client, one or more marker nodes with the MHK as a key and the encrypted ciphertext representation as a value; and
storing, by the web server, the one or more nodes and the one or more marker nodes for each corresponding node of the one or more nodes created.

17. The method as recited in claim 16, further comprising:
calculating, by the client via the security module, a parent hash reference (PHR) and parent secret hash (PSH), and storing the PHR and the PSH within memory of the client;
prompting, by the client, the user to input the one or more node markers for the one or more subsequent nodes in the path;
receiving, from the user, the one or more node markers for the one or more subsequent nodes in the path;
establishing, by the client, a user input value for the one or more subsequent nodes in the path, wherein the user input value for the one or more subsequent nodes in the path is received by the client from the user or set by the client in response to the user not providing the user input value for the one or more subsequent nodes in the path;
iteratively processing, by the client, the one or more node markers for the one or more subsequent nodes in the path, an MHR of the one or more subsequent nodes, and a UIK of the one or more subsequent nodes, an index position in the path incremented by one, and the user input value for the one or more subsequent nodes in the path to create the one or more subsequent nodes forming the tree index data structure; and
storing, by the web server, the one or more subsequent nodes.

18. The method as recited in claim 17, further comprising:
implementing, by the client, the MHR of the one or more subsequent nodes, the PHR and the PSH of the one or more nodes as input, wherein the MHR and the PSH are combined to produce a child hash reference (CHR);
creating, by the client, one or more edges connecting the one or more nodes to the one or more subsequent nodes by constructing the one or more edges from the PHR and the CHR; and
storing, by the web server, the one or more edges.

* * * * *